US008308305B2

(12) United States Patent
Nakano et al.

(10) Patent No.: US 8,308,305 B2
(45) Date of Patent: Nov. 13, 2012

(54) PROJECTOR WITH OPTICAL FILTER REDUCING INTERNAL MULTIPLE REFLECTIONS

(75) Inventors: Kiyotaka Nakano, Matsumoto (JP); Osamu Fujimaki, Matsumoto (JP); Ryo Hyodo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1142 days.

(21) Appl. No.: 11/503,173

(22) Filed: Aug. 14, 2006

(65) Prior Publication Data

US 2007/0047052 A1 Mar. 1, 2007

(30) Foreign Application Priority Data

Sep. 1, 2005 (JP) .................................. 2005-253904

(51) Int. Cl.
*G03B 21/14* (2006.01)
(52) U.S. Cl. ................ 353/84; 353/37; 353/50; 353/73; 353/77; 353/98
(58) Field of Classification Search .................... 353/84, 353/88, 89, 90, 91, 92, 93, 37, 50, 73, 77, 353/98, 99
See application file for complete search history.

(56) References Cited

U.S. PATENT DOCUMENTS

| 4,060,318 A * | 11/1977 | Hansford | 353/42 |
|---|---|---|---|
| 4,130,353 A * | 12/1978 | Henkelmann et al. | 353/85 |
| 4,169,668 A * | 10/1979 | Grenier | 353/90 |
| 5,690,407 A * | 11/1997 | Kikuchi et al. | 353/88 |
| 5,917,561 A | 6/1999 | Hatanaka | |
| 6,212,013 B1 * | 4/2001 | Kodama et al. | 359/634 |
| 6,231,190 B1 * | 5/2001 | Dewald | 353/31 |
| 6,611,381 B2 * | 8/2003 | Kodama et al. | 359/619 |
| 6,644,812 B2 * | 11/2003 | Kodama et al. | 353/31 |
| 6,648,476 B2 * | 11/2003 | Watanabe et al. | 353/97 |
| 6,805,452 B2 * | 10/2004 | Okuyama et al. | 353/122 |
| 6,860,607 B2 | 3/2005 | Yanagisawa | |
| 2004/0246448 A1 * | 12/2004 | Ogawa et al. | 353/84 |
| 2005/0128439 A1 * | 6/2005 | Yoshida et al. | 353/84 |
| 2005/0219474 A1 * | 10/2005 | Hara et al. | 353/88 |

FOREIGN PATENT DOCUMENTS

| JP | A 05-034608 | 2/1993 |
|---|---|---|
| JP | A 2003-107579 | 4/2003 |
| JP | A 2004-45482 | 2/2004 |
| JP | A 2005-070476 | 3/2005 |

* cited by examiner

*Primary Examiner* — Francis M Legasse, Jr.
*Assistant Examiner* — Bao-Luan Le
(74) *Attorney, Agent, or Firm* — Oliff & Berridge, PLC

(57) ABSTRACT

A projector includes: a light source device, a color-separating optical system for separating a light beam irradiated by the light source device into a plurality of color light components, a plurality of optical modulators for modulating each of the separated color light components in accordance with image information, a color-combining optical device for combining optical images modulated by the plurality of optical modulators and a projection optical device for projecting the combined optical images in an enlarged manner. An optical filter that reflects a predetermined spectral component of the light beam and transmits the other spectral component is disposed in an optical path between the light source device and the optical modulators The optical filter is disposed such that a light-irradiation side surface for irradiating the light beam is inclined by a predetermined angle relative to a plane orthogonal to an optical axis of the light beam.

5 Claims, 16 Drawing Sheets

IRRADIATION AREA OF STRAY LIGHT

IRRADIATION AREA OF STRAY LIGHT

IRRADIATION AREA OF STRAY LIGHT

IRRADIATION AREA OF STRAY LIGHT

PROJECTOR WITH OPTICAL FILTER REDUCING INTERNAL MULTIPLE REFLECTIONS

The entire disclosure of Japanese Patent Application No. 2005-253904, filed Sep. 1, 2005, is expressly incorporated by reference herein.

BACKGROUND

1. Technical Field

The present invention relates to a projector.

2. Related Art

Projectors have been used in the fields of presentation, home theater systems and the like. Such projectors include a projector that is provided with a light source device, a color-separating optical system for separating a light beam irradiated by the light source into a plurality of color light components, three optical modulators such as liquid crystal panels each for modulating a separated color light component in accordance with image information, a color-combining optical system such as a prism for combining the color light components modulated by the optical modulators, and a projection optical device such as a projection lens for projecting a combined optical image in an enlarged manner.

When this type of projector is used for business use as a data projector, a high-pressure discharge lamp with high relative spectral intensity in the wavelength band for green (approx. of 500 to 570 nm) or in the wavelength band for blue (approx. of 420 to 460 nm) is used as the light source in order to provide sufficient luminance to a projection image.

However, when the projector with the above-described light source is diverted to home use, the wavelength band for green is intense, so that a portion to be white of the projection image becomes greenish, causing reduction in brightness and contrast when trying to correct this problem by using the optical modulators.

To solve this disadvantage, there has been known an arrangement in which an optical filter for eliminating a predetermined spectral component is disposed on the downstream of a projection lens in the optical path (see, for example, JP-A-2004-45482).

The optical filter disclosed in the document is a reflective optical filter that includes a base and optical conversion films deposited on a light-incident surface of the base, the optical conversion films having different refractive indexes. Since the optical filter is disposed on the downstream of the projection lens in the optical path, an optical image irradiated from the projection lens passes through the optical filter, so that reduction in contrast of the projection image can be prevented.

However, reflection property of the optical filter disclosed in the above-described document varies depending on an incident-angle of the light beam. In addition, the projection lens is adapted to irradiate the light beam such that the light beam is expanded at a predetermined angle relative to the center of the optical path in order to form the projection image in an enlarged manner. Hence, the light beam forming a peripheral portion of the projection image has a large incident-angle relative to a light-incident side surface of the optical filter, causing variation in color between the peripheral portion and the middle portion of the projection image.

SUMMARY

An object of the invention is to provide a projector that can prevent degradation in contrast of a projection image and reduce variation in color of the projection image.

A projector according to the invention includes: a light source device, a color-separating optical system for separating a light beam irradiated by the light source device into a plurality of color light components, a plurality of optical modulators for modulating each of the separated color light components in accordance with image information, a color-combining optical device for combining optical images modulated by the plurality of optical modulators and a projection optical device for projecting the combined optical images in an enlarged manner. With the projector, an optical filter that reflects a predetermined spectral component of the light beam and transmits the other spectral component is disposed in an optical path between the light source device and the optical modulators. The optical filter is disposed such that a light-irradiation side surface for irradiating the light beam is inclined by a predetermined angle relative to a plane orthogonal to an optical axis of the light beam.

The light source device may be a high-pressure discharge lamp.

The optical filter may be an optical filter having: a glass substrate made of a blue glass sheet or a white glass sheet; and an optical conversion film in which thin layers of different refractive indexes are deposited on a surface of the glass substrate.

According to the aspect of the invention, by disposing the optical filter in the optical path between the light source device and the optical modulator, a predetermined spectral component of the light beam irradiated by the light source device can be eliminated by the optical filter. For example, eliminating a spectral component in the wavelength band for green at a predetermined rate by the optical filter can prevent a portion to be white from becoming greenish, thereby preventing degradation in contrast of the projection image.

In addition, as compared to an arrangement in which the optical filter is disposed on the downstream of the projection optical device in the optical path, disposing the optical filter in the optical path between the light source device and the optical modulator can reduce a difference in incident angles relative to the light-incident side surface of the optical filter between a light beam forming a peripheral portion of the optical image and a light beam forming the middle of the optical image, thereby reducing variation in color.

When the optical filter is disposed in the optical path between the light source device and the optical modulator such that the light-irradiation side surface of the optical filter is orthogonal to the optical axis of the light beam, following problems often occur.

As one example, when the light beam irradiated by the light source device is irradiated onto the optical modulator (a liquid crystal panel), it is known that the light beam is reflected at the outer periphery of the optical modulator to be stray light in the projector due to the structure of the optical modulator.

The stray light reflected at the outer periphery of the optical modulator returns to the light source device along a trajectory on which the light beam has traveled from the light source device to the optical modulator. When the light-irradiation side surface of the optical filter is disposed so as to be orthogonal to the optical axis of the light beam, the stray light is reflected again by the light-irradiation side surface of the optical filter to be irradiated onto the image formation area and the like of the optical modulator. In this condition, since unnecessary light is irradiated onto the image formation area of the optical modulator, variation in color of the projection image increases, so that the projection image cannot be maintained in an appropriate manner.

In contrast, according to the aspect of the invention, the optical filter is disposed such that the light-irradiation side surface is inclined by a predetermined angle relative to the plane orthogonal to the optical axis of the light beam. Accordingly, by setting an inclination angle of the optical filter such that the stray light reflected by the light-irradiation side surface of the optical filter does not hit the image formation area of the optical modulator, the unnecessary light can be prevented from being irradiated onto the image formation area of the optical modulator, thereby appropriately maintaining the projection image.

With the projector according to the invention, the optical filter may be preferably disposed on the upstream of the color-separating optical system in the optical path.

According to the aspect of the invention, the optical filter is disposed on the upstream of the color-separating optical system in the optical path. More specifically, the optical filter is on the upstream in the optical path of a separating position where light is separated into a plurality of color light components by the color-separating optical system. Hence, the optical filter can correct each of spectral components in the wavelength bands for, for example, red, green and blue of the light beam irradiated by the light source device, so that strength balance of the colors can be set to a predetermined level, thereby displaying the projection image in predetermined shades.

The projector according to the invention may preferably further include: an integrator illuminating optical system that includes the light source device, separates the light beam irradiated by the light source device into a plurality of sub-beams and superposes the plurality of sub-beams on image formation areas of the optical modulators. The integrator illuminating optical system may preferably include: a first lens array having a plurality of lens elements for separating the light beam irradiated by the light source device into the plurality of sub-beams, a second lens array having a plurality of lens elements of a number corresponding to that of the plurality of lens elements of the first lens array and a superposing lens for superposing the plurality of sub-beams irradiated from the second lens array on the image formation areas of the optical modulators. The optical filter is disposed such that a light-irradiation side surface for irradiating the light beam is inclined by a predetermined angle relative to a plane orthogonal to an optical axis of the light beam.

When the optical filter is disposed, in the optical path between the light source device and the optical modulator, at a position displaced from a combined focal plane on the upstream side in the optical path of the superposing lens and an optical system such as a lens (hereinafter referred to as a non-focal plane position), the optical system being disposed in the optical path between the superposing lens and the optical modulator and focusing together with the superposing lens the light beam irradiated from the superposing lens onto the image formation area of the optical modulator, more concretely, when the optical filter is disposed on the downstream of the superposing lens in the optical path, the stray light reflected at the outer periphery of the optical modulator is reflected by the light-irradiation side surface of the optical filter as divergent light.

For example, when the optical filter is disposed at the non-focal plane position such that the light-irradiation side surface of the optical filter is orthogonal to the optical axis of the light beam, the stray light reflected at the outer periphery of the optical modulator returns back toward the light source device along the trajectory on which the light beam has traveled from the light source device to the optical modulator. The returned stray light is reflected again by the light-irradiation side surface of the optical filter as the divergent light and irradiated onto the optical modulator so as to planarly cover the image formation area of the optical modulator. In other words, the stray light is irradiated on the optical modulator in a relatively large area. Hence, when the inclination angle of the optical filter is set such that the stray light reflected by the light-irradiation side surface of the optical filter does not hit the image formation area of the optical modulator, a movement amount for moving the stray light irradiated on the optical modulator becomes large since the stray light is irradiated on the optical modulator in the relatively large area. In other words, the inclination angle needs to be relatively large, so that the optical filter requires a wider setting space in the optical axis direction of the optical filter, the setting space being increased in accordance with the inclination angle of the optical filter. If the optical filter is inclined too much, the projection image often contains variation in color and color shift due to the property of the optical filter.

According to the aspect of the invention, the optical filter is disposed, in the optical path between the light source device and the optical modulator, at a position near the combined focal plane on the upstream side in the optical path of the superposing lens and the optical system such as the lens (hereinafter referred to as a focal plane position), the optical system being disposed in the optical path between the superposing lens and the optical modulator and focusing together with the superposing lens the light beam irradiated from the superposing lens onto the image formation area of the optical modulator. More concretely, the optical filter is disposed between the second lens array and the superposing lens. Hence, the stray light reflected at the outer periphery of the optical modulator can be reflected by the light-irradiation side surface of the optical filter as convergent light.

For example, when the optical filter is disposed at the focal plane position such that the light-irradiation side surface of the optical filter is orthogonal to the optical axis of the light beam, the stray light reflected at the outer periphery of the optical modulator returns back toward the light source device along the trajectory on which the light beam has been traveled from the light source device to the optical modulator. The returned stray light is reflected again by the light-irradiation side surface of the optical filter as the divergent light and focused at the outer periphery of the optical modulator. In other words, the stray light is irradiated on the optical modulator in a small area. Hence, when the inclination angle of the optical filter is set such that the stray light reflected by the light-irradiation side surface of the optical filter does not hit the image formation area of the optical modulator, the movement amount for moving the stray light irradiated on the optical modulator becomes small since the stray light is irradiated on the optical modulator in the relatively small area. In other words, the inclination angle can be relatively small, so that the optical filter does not require a wide setting space in the optical axis direction of the optical filter. In addition, since the inclination angle of the optical filter can be set small, variation in color and color shift of the projection image which are caused by inclining the optical filter too much can be avoided.

The projector according to the invention may preferably further include: an optical component casing for housing an optical component disposed in the optical path of the light beam, and a movement mechanism that supports the optical filter and moves the optical filter into and out of the optical path of the light beam inside the optical component casing with the light-irradiation side surface inclined by the predetermined angle relative to the plane orthogonal to the optical axis of the light beam.

According to the aspect of the invention, the movement mechanism movably supports the optical filter. Hence, the movement mechanism can move the optical filter to be out of the optical path when in business use and to be in the optical path when in home use. Thus, an appropriate projection image can be obtained in accordance with the purpose of the use.

For example, when employing an arrangement in which the movement mechanism rotates the optical filter in an out-plane direction, the setting space for the optical filter in the optical axis direction needs to be relatively large in order to prevent mechanical interference between the optical filter and the other optical components during rotation.

According to the aspect of the invention, the movement mechanism moves (slides) the optical filter into and out of the optical path of the light beam with the light-irradiation side surface inclined by a predetermined angle relative to the plane orthogonal to the optical axis of the light beam. Accordingly, the setting space for the optical filter in the optical axis direction can be set small as compared to, for example, the arrangement in which the movement mechanism rotates the optical filter in the out-plane direction, thereby enhancing flexibility in layouting the optical filter.

With the projector of the invention, the movement mechanism may preferably include: a fixing member to be fixed on the optical component casing, a movement member that supports the optical filter and is movably attached to the fixing member, and a drive mechanism for moving the movement member such that the optical filter is positioned in and out of the optical path of the light beam. The movement member is a plate body having a substantially C-shape. The movement member supports the optical filter inside the substantially C-shape. A pair of first supporting portions and a pair of second supporting portions are provided on opposing inner edges of the substantially C-shape of the movement member. Both pairs are adapted to hold opposing ends of the optical filter. The pair of first supporting portions and the pair of second supporting portions are located out of alignment with a predetermined gap in the optical axis direction by a predetermined length. Both pairs support the optical filter with the light-irradiation side surface of the optical filter inclined relative to the plane orthogonal to the optical axis of the light beam. A biasing member for biasing the optical filter in an inclining direction of the optical filter is provided in at least one of a first space between the optical filter and one of the pair of first supporting portions located on the other side of the inclining direction of the optical filter and a second space between the optical filter and one of the pair of second supporting portions located on the other side of the inclining direction of the optical filter.

According to the aspect of the invention, the movement member of the movement mechanism is provided with the pair of first supporting portions and the pair of second supporting portions, a position of the pair of first supporting portions in the optical axis direction is displaced from that of the pair of second supporting portions by a predetermined distance. Accordingly, by supporting the opposing sides of the optical filter with the pair of first supporting portions and the pair of second supporting portions, the light-irradiation side surface of the optical filter can be easily set inclined by the predetermined angle relative to the plane orthogonal to the optical axis of the light beam.

In addition, since the optical filter is attached to the movement member by biasing the optical filter in the inclining direction by the biasing member. Hence, when the optical filter needs to be replaced due to its defects, the optical filter can be easily released from the biased state by removing the biasing member, thereby facilitating the replacement of the optical filter.

Further, since the movement member has the substantially C-shape in plan view, by disposing the tips of the C-shape near the optical axis of the light beam, the movement member can be prevented from shielding the light beam when the optical filter is moved into and out of the optical path, thereby appropriately maintaining the projection image.

BRIEF DESCRIPTION OF THE DRAWINGS

The invention will be described with reference to the accompanying drawings, wherein like numbers reference like elements.

DESCRIPTION OF EXEMPLARY
EMBODIMENT(S)

An embodiment of the invention will be described below with reference to the attached drawings.

1 Exterior Arrangement

Figure 1:
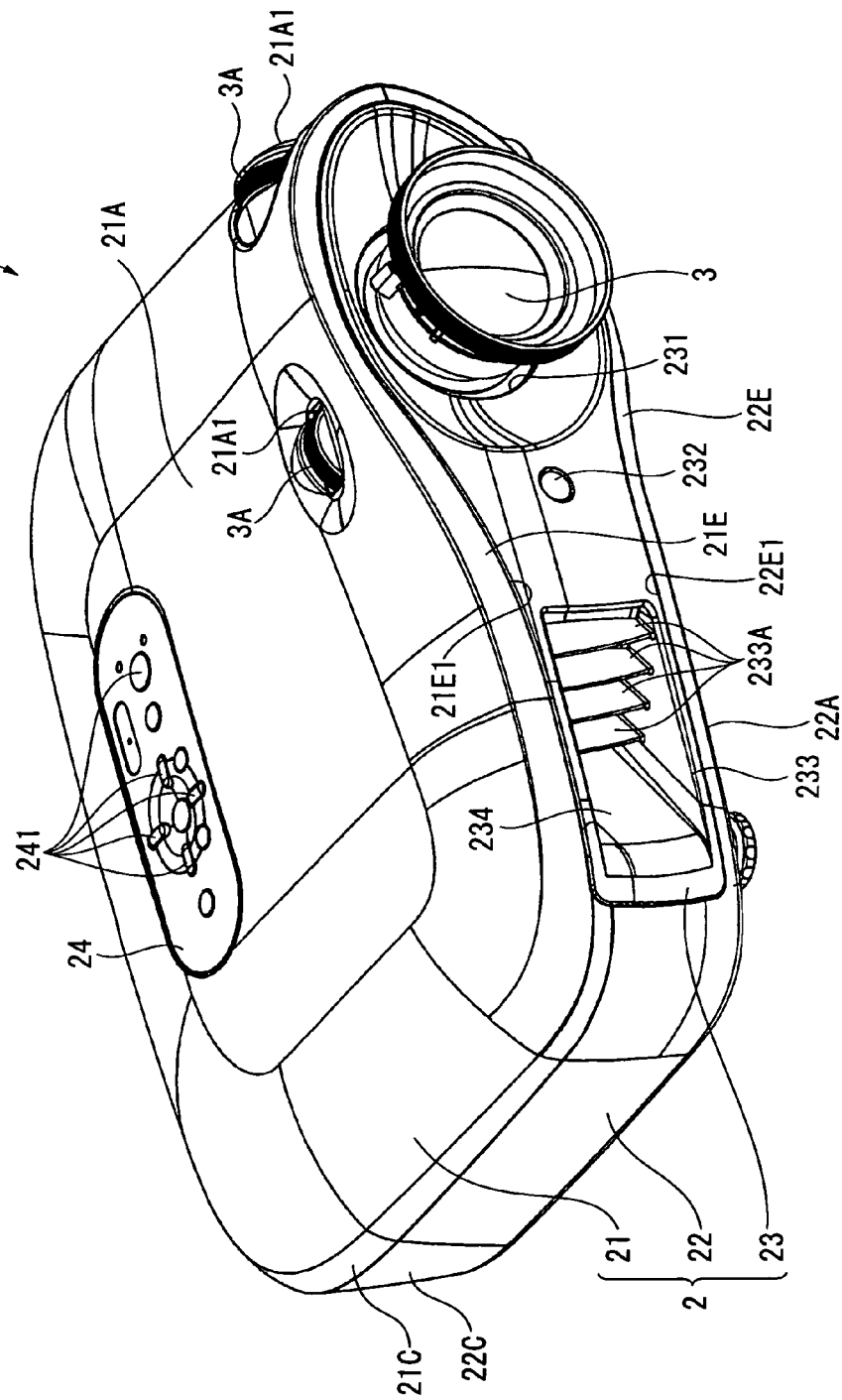
FIG. 1 is a perspective view showing an exterior appearance of a projector of an exemplary embodiment of the invention.
Figure 2:
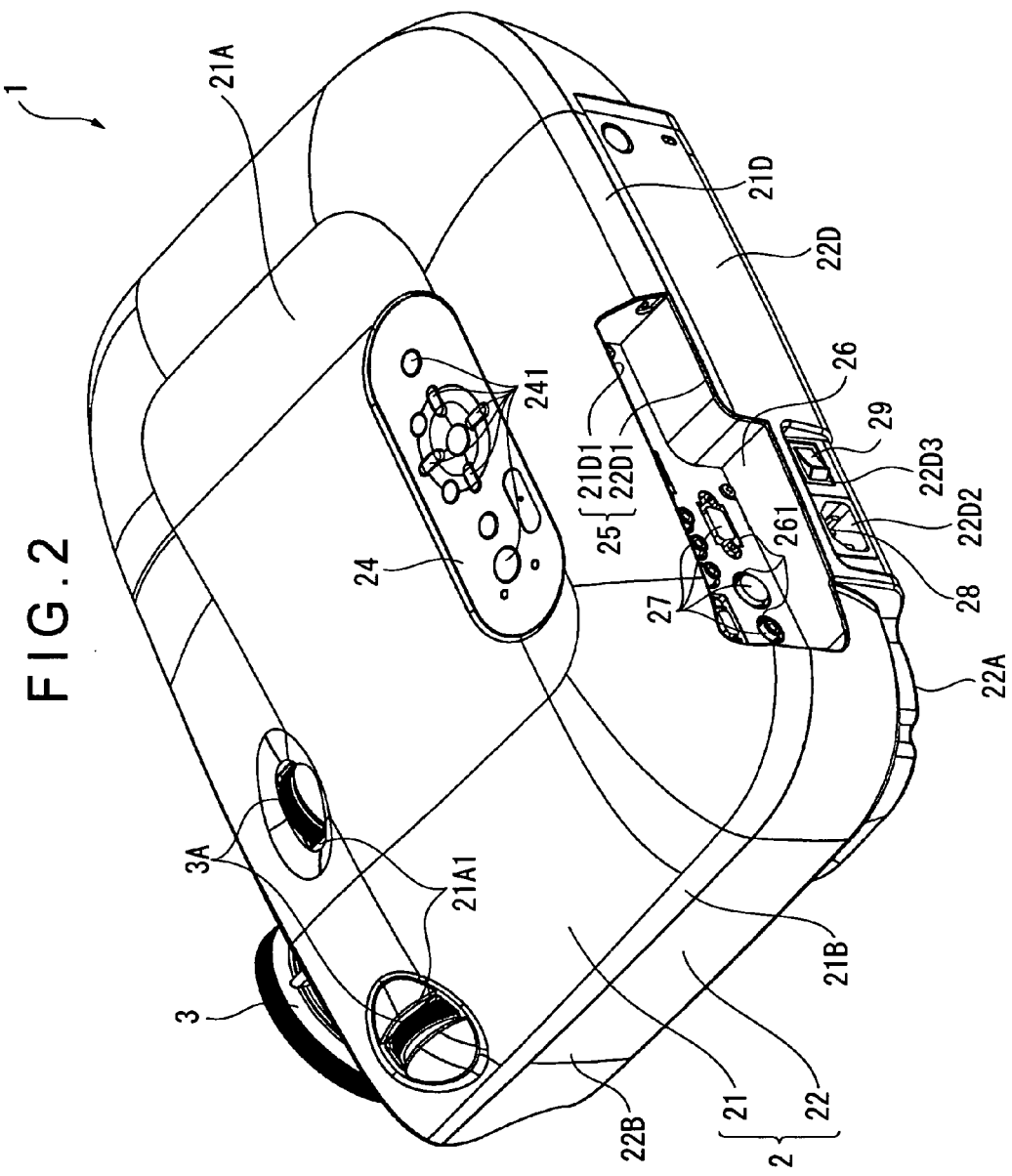
FIG. 2 is another perspective view showing the exterior appearance of the projector of the aforesaid exemplary embodiment.

FIGS. 1 and 2 are perspective views showing exterior appearances of a projector 1. Specifically, FIG. 1 is a perspective view of the projector 1 when seen from an upper front side. FIG. 2 is a perspective view of the projector 1 when seen from an upper rear side.

The projector 1 modulates a light beam irradiated by a light source in accordance with image information to form an optical image and projects the formed optical image on a screen (not shown) in an enlarged manner. As shown in FIGS. 1 and 2, the projector 1 is provided with a substantially rectangular parallelepiped exterior case 2 and a projection lens 3 (a projection optical device) exposed from the exterior case 2.

The projection lens 3 is a lens set including a plurality of lenses housed in a cylindrical lens barrel. The projection lens 3 projects in an enlarged manner an image light modulated in accordance with the image information by a main body of the projector 1.

The exterior case 2 is made of synthetic resin and houses the main body of the projector 1. As shown in FIGS. 1 and 2, the exterior case 2 has an upper case 21 covering an upper part of the main body, a lower case 22 covering a lower part of the main body and a front case 23 (FIG. 1) covering a front part of the main body.

As shown in FIGS. 1 and 2, the upper case 21 includes: a top portion 21A forming an top surface, a part of each lateral surface, a part of a rear surface and a part of a front surface of the exterior case 2; a lateral portion 21B (FIG. 2); a lateral portion 21C (FIG. 1); a rear portion 21D (FIG. 2); and a front portion 21E (FIG. 1).

As shown in FIGS. 1 and 2, the top portion 21A has a substantially rectangular and convex shape in plan view with gentle curves extending from substantially the middle in plan view toward the front, lateral and rear surface sides.

As shown in FIGS. 1 and 2, two openings 21A1 are formed on the front right-hand side when seen from the front side. A part of rotary knobs 3A for operating the projection lens 3 and adjusting a projection position of a projection image projected on a screen (not shown) is exposed through the two openings 21A1.

As shown in FIGS. 1 and 2, an operation panel 24 used for actuating and adjusting the projector 1 horizontally extends on the rear side of the openings 21A1 of the top portion 21A. When an operation button 241 of the operation panel 24 is pressed down, the operation button 241 touches a tactile switch mounted on a circuit board (not shown) disposed on the inner side of the operation button 241, thereby allowing a desired operation. An LED (Light Emitting Diode) (not shown) is mounted on the circuit board so as to emit light in accordance with a predetermined operation.

Note that the circuit board of the above-described operation panel 24 is electrically connected with a control board (not shown) so that an operation signal generated by the pressing-down on the operation button 241 is output to the control board.

As shown in FIGS. 1 and 2, the lateral portions 21B, 21C, the rear portion 21D and the front portion 21E extend substantially downward from respective peripheral edges of the rectangular shape in plan view of the top portion 21A.

As shown in FIG. 2, a cutout 21D1 is formed in the rear portion 21D on the left-hand side when seen from the rear surface side, the cutout 21D1 having a C-shape in plan view which extends from a lower edge of the rear portion 21D toward the upper side.

As shown in FIG. 1, a cutout 21E1 is formed in the front portion 21E, the cutout 21E1 having a C-shape in plan view which extends from a lower edge of the front portion 21E toward the upper side.

As shown in FIGS. 1 and 2, the lower case 22 includes: a bottom portion 22A forming a bottom surface, a part of each lateral surface, a part of the rear surface and a part of the front surface of the exterior case 2; a lateral portion 22B (FIG. 2); a lateral portion 22C (FIG. 1); a rear portion 22D (FIG. 2); and a front portion 22E (FIG. 1).

Although not shown in detail in the figures, the bottom portion 22A is a flat surface in a substantially rectangular shape. The bottom portion 22A is provided with a plurality of legs for mounting the projector 1 on a surface of, for example, a desk and an intake port for introducing cooling air from the outside into the projector 1.

As shown in FIGS. 1 and 2, the lateral portions 22B, 22C, the rear portion 22D and the front portion 22E extend upward from respective peripheral edges of the bottom portion 22A in the rectangular shape in plan view.

As shown in FIG. 2, a cutout 22D1 is formed in the rear portion 22D on the left-hand side when seen from the rear surface side, the cutout 22D1 having a C-shape in plan view which extends downward from an upper edge of the rear portion 22D toward the lower side. When the upper case 21 and the lower case 22 are coupled together, the cutouts 21D1, 22D1 are connected to each other to form an opening 25. As shown in FIG. 2, a connector terminal mount 26 having a profile corresponding to the shape of the opening 25 is fit and fixed in the opening 25.

As shown in FIG. 2, the connector terminal mount 26 has a substantially C-shape in cross section to be dented inward relative to the surfaces of the rear portions 21D, 22D. A plurality of holes 261 is defined in a bottom portion of the connector terminal mount 26. As shown in FIG. 2, a plurality of connector terminals 27 for inputting an image signal, an audio signal and the like from external electronic devices are exposed through the plurality of holes 261. An interface board (not shown) for processing the signal input by the connector terminals 27 is disposed inside the connector terminal mount 26.

Note that the interface board is electrically connected with the control board and the signal processed by the interface board is output to the control board.

As shown in FIG. 2, two openings 22D2, 22D3 are formed in the rear portion 22D on the lower side of the cutout 22D1. As shown in FIG. 2, an internal inlet connector 28 is exposed through the opening 22D2 on the left-hand side when seen from the rear surface side, so that electric power can be supplied from the outside into the main body of the projector 1. As shown in FIG. 2, a power switch 29 is exposed through the opening 22D3 on the right-hand side when seen from the rear surface side, so that the main power source of the projector 1 can be turned on and off by switching the power switch 29.

Note that the power switch 29 is electrically connected with the control board (not shown), so that an operation signal generated by the switching of the power switch 29 is output to the control board.

As shown in FIG. 1, a cutout 22E1 is formed in the front portion 22E, the cutout 22E1 having a C-shape in plan view which extends from an upper edge of the front portion 22E toward the lower side. When the upper case 21 and the lower case 22 are coupled together, the front case 23 is supported and fixed by inner portions of the cutout 21E1 of the front portion 21E and the cutout 22E1 of the front portion 22E.

As shown in FIG. 1, the front case 23 has a substantially ellipsoidal shape horizontally elongated. When being connected with the upper case 21 and the lower case 22, the front case 23 shuts an opening defined by the cutouts 21E1, 22E1.

As shown in FIG. 1, a substantially circular aperture 231 is formed in a bottom portion of the front case 23. The aperture 231, which is curved toward the inside of the exterior case 2, is formed on the right-hand side when seen from the front side. An end of the projection lens 3 is exposed through the aperture 231.

As shown in FIG. 1, a remote controller light-receiving window 232 is formed substantially at the center of the front case 23 in the longitudinal direction. A remote controller light-receiving module (not shown) for receiving an operation signal from a remote controller (not shown) is disposed inside the remote controller light-receiving window 232.

Note that the remote controller is provided with an activation switch, an adjustment switch and the like which are similar to those provided on the above-described operation panel 24. When the remote controller is operated, an infrared signal corresponding to this operation is output from the remote controller. The infrared signal is received by the remote controller light-receiving module via the remote controller light-receiving window 232 and processed by the control board (not shown).

As shown in FIG. 1, an exhaust port 233 of a rectangular shape in plan view for exhausting hot air inside the projector 1 to the outside is formed on the left-hand side when seen from the front side.

As shown in FIG. 1, the periphery of the exhaust port 233 is formed to be cylindrical so as to project inward. Specifically, the periphery of the exhaust port 233 is formed to have a cylindrical shape projecting toward the projection lens 3 in an inclined manner relative to a projection direction of the projection lens 3. As shown in FIG. 1, a plurality of vanes 233A is provided on an inner portion of the exhaust port 233. The plurality of vanes 233A are vertically attached so as to extend in a projecting direction of the periphery of the exhaust port 233.

2 Internal Arrangement

Figure 3:
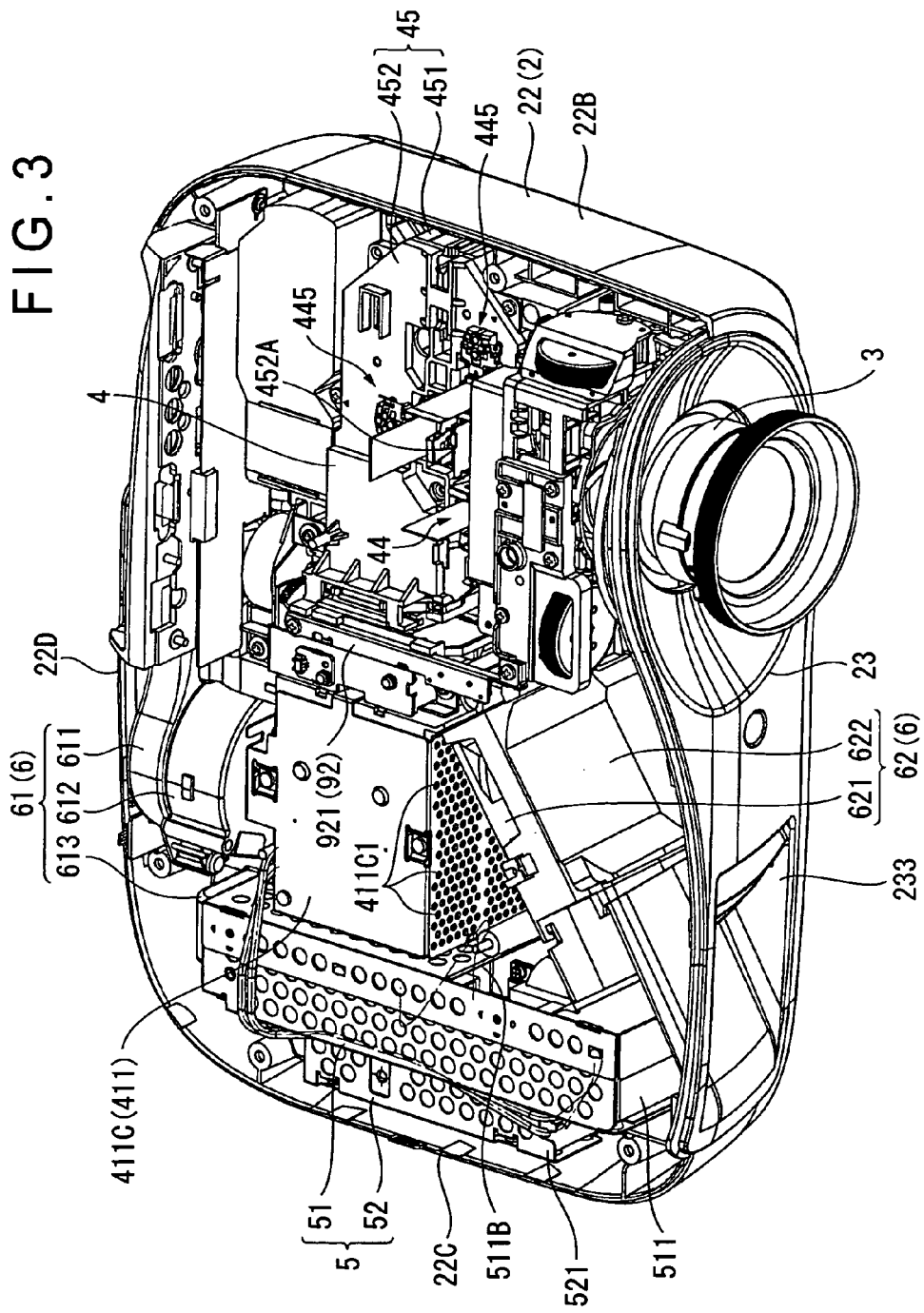
FIG. 3 is an illustration showing an interior structure of the projector of the aforesaid exemplary embodiment.
Figure 4:
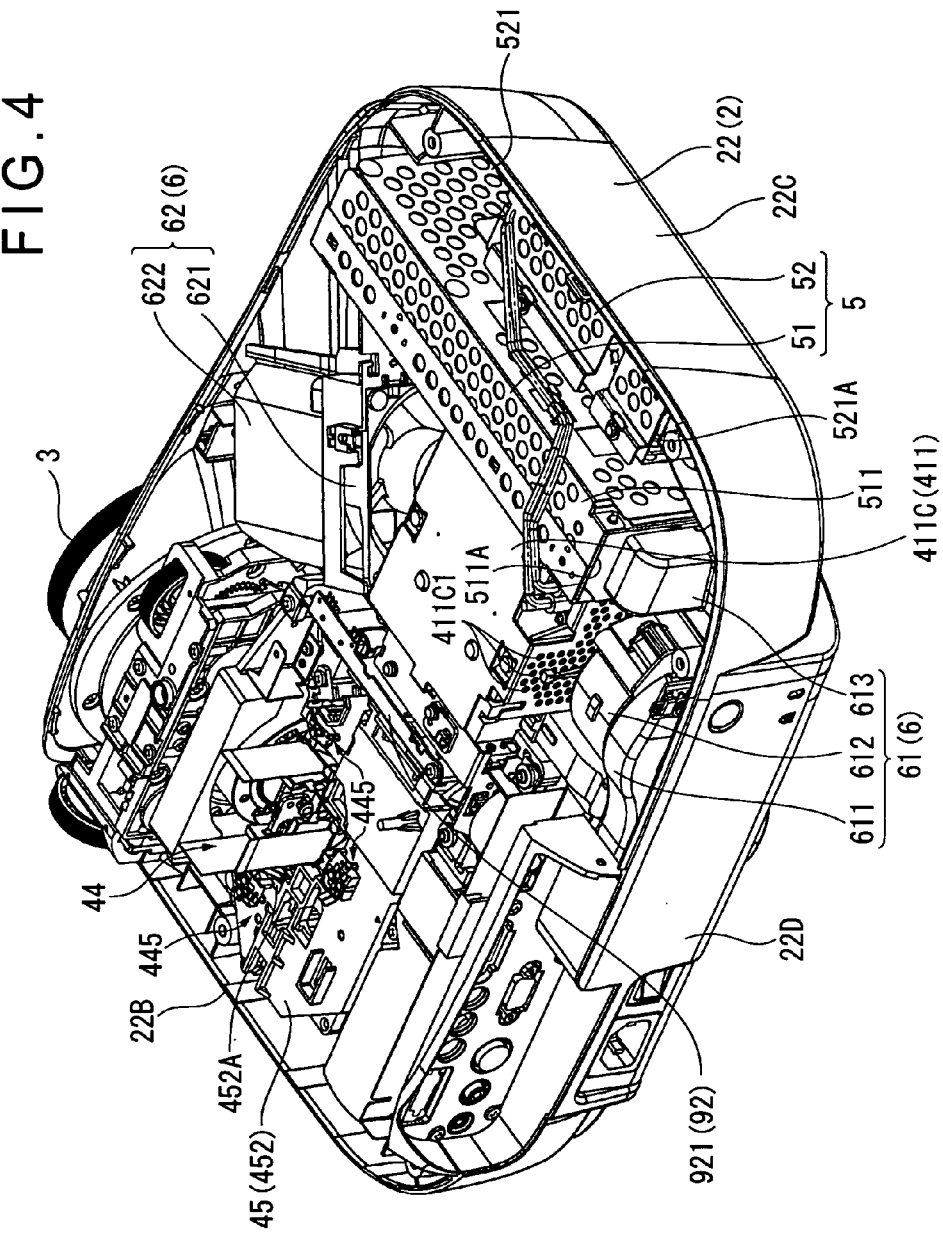
FIG. 4 is another illustration showing the interior structure of the projector of the aforesaid exemplary embodiment.

FIGS. 3 and 4 are illustrations showing an internal arrangement of the projector 1. Specifically, FIG. 3 is a perspective view of the projector 1 when seen from the upper front side with the upper case 21 and the control board removed. FIG. 4 is a perspective view of the projector 1 when seen from the upper rear side with the upper case 21 and the control board removed.

As shown in FIGS. 3 and 4, the main body of the projector 1 is housed in the exterior case 2. The main body includes an optical unit 4 as an optical device, a power source unit 5 and a cooling unit 6.

Note that the main body further includes the control board (not shown) for controlling the overall projector 1 in addition to the optical unit 4, the optical device 5 and the cooling unit 6, the control board being disposed on the upper side of the optical unit 4.

3 Detailed Arrangement of Optical Unit

Figure 5:
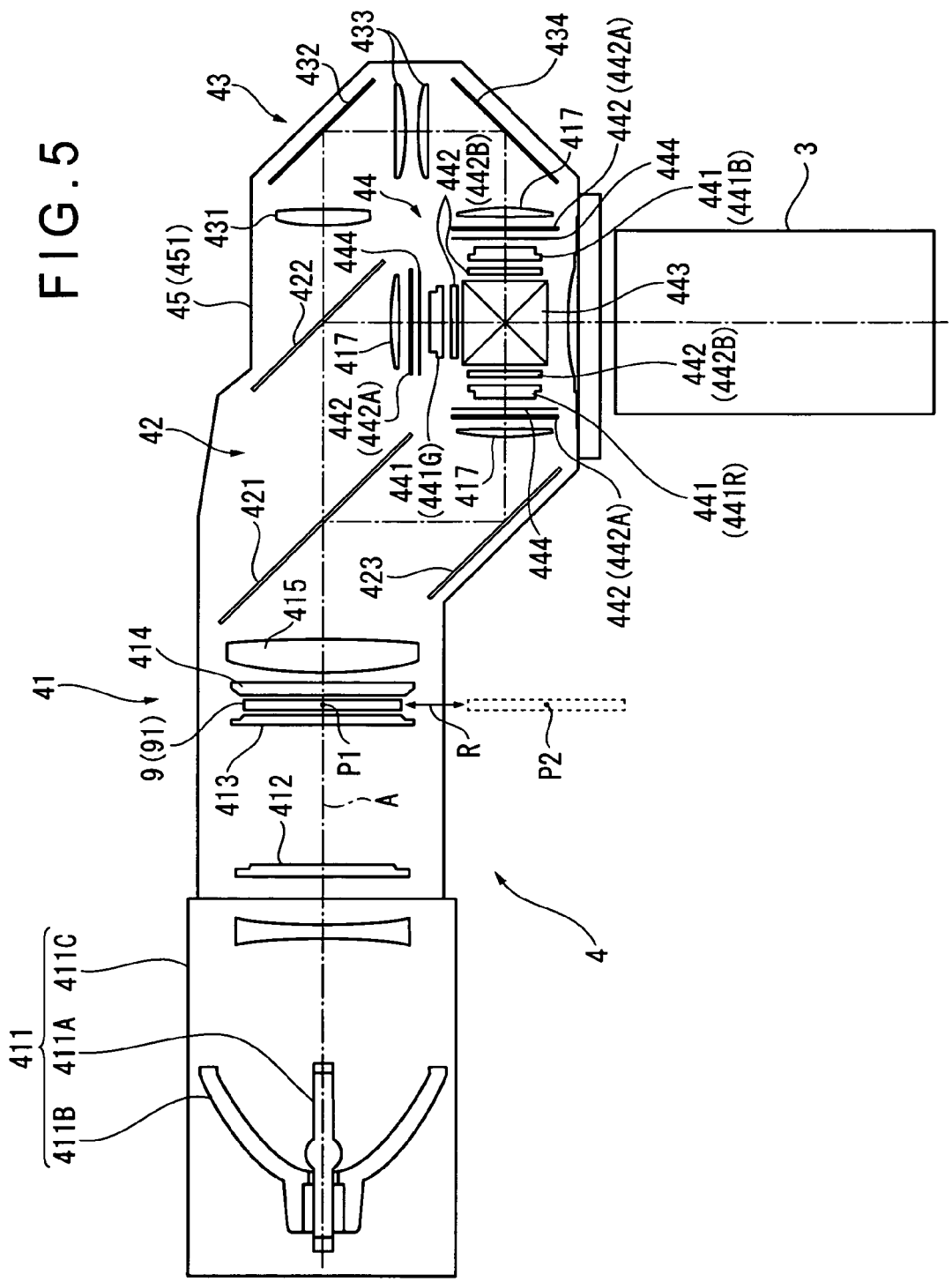
FIG. 5 is a plan view schematically showing an optical system of an optical unit of the aforesaid exemplary embodiment.

FIG. 5 is a plan view schematically showing an optical system of the optical unit 4.

The optical unit 4 forms the image light in accordance with image information under the control of the control board. As shown in FIGS. 3 and 4, the optical unit 4 extends horizontally along the rear portions 21D, 22D in the exterior case 2 and forward along the lateral portions 21B, 22B to form an L-shape in plan view as a whole.

As shown in FIG. 5, the optical unit 4 includes an integrator illuminating optical system 41, a color-separating optical system 42, a relay optical system 43, an electrooptic device 44, an optical filter device 9 and an optical component casing 45 made of synthetic resin. The optical component casing 45 houses the optical components 41 to 44 and the optical filter device 9 and supports and fixes the projection lens 3 at a predetermined position.

The integrator illuminating optical system 41 is an optical system for substantially uniformly illuminating an image formation area of each below-described liquid crystal panel of the electrooptic device 44. As shown in FIG. 5, the integrator illuminating optical system 41 includes a light source device 411, a first lens array 412, a second lens array 413, a polarization converter 414 and a superposing lens 415.

The light source device 411 includes a light source lamp 411A (a radial light source) for irradiating a radial light beam, a reflector 411B for reflecting the radial light beam irradiated by the light source lamp 411A and a lamp housing 411C (FIGS. 3 to 5). Note that the light source lamp 411A may be a high-pressure discharge lamp such as a halogen lamp, a metal halide lamp and a high-pressure mercury lamp. A parabolic mirror is used as the reflector 411B. An ellipsoidal mirror may be used with a parallelizing concave lens in place of the parabolic mirror.

The lamp housing 411C houses the light source lamp 411A and the reflector 411B. The lamp housing 411C is mounted on the bottom portion of the lower case 22 and connected with the optical component casing 45.

The first lens array 412 has small lenses (lens elements) arranged in a matrix form, each lens having a substantially rectangular profile when viewed in the optical axis direction. The respective small lenses separate the light beam irradiated by the light source lamp 411A into a plurality of sub-beams.

The second lens array 413 has substantially the same arrangement as the first lens array 412 and includes small lenses (lens elements) in a matrix form. The second lens array 413 focuses images of the small lenses of the first lens array 412 onto the below-described liquid crystal panels together with the superposing lens 415.

The polarization converter 414 is disposed on the downstream of the second lens array 413 in the optical path. The polarization converter 414 converts the light from the second lens array 413 into substantially uniform polarized light, thereby enhancing light utilization efficiency of the electrooptic device 44.

Specifically, the respective sub-beams converted into the substantially uniform-type polarized light by the polarization converter 414 are substantially superposed on the below-described liquid crystal panels of the electrooptic device 44 by the superposing lens 415. Since only uniform-type of polarized light can be used by the projector 1 of the exemplary embodiment, in which the liquid crystal panels are used to convert polarized light, approximately half of the light beam from the light source lamp 411A emitting random polarized light cannot be used. Accordingly, with the use of the polarization converter 414, substantially all of the light beam irradiated by the light source lamp 411A is converted into substantially uniform polarized light to enhance the light utilization efficiency of the electrooptic device 44.

The color-separating optical system 42 has two dichroic mirrors 421 and 422 as well as a reflection mirror 423 and separates the plurality of sub-beams irradiated from the integrator illuminating optical system 41 by the dichroic mirrors 421 and 422 into three color light components of red, green and blue.

The relay optical device 43 includes an incident-side lens 431, a relay lens 433 and reflection mirrors 432 and 434 and guides the color light components separated by the color-separating optical device 42 to the blue-light liquid crystal panel.

Blue and green light components of the light beam irradiated from the integrator illuminating optical system 41 are transmitted through the dichroic mirror 421 of the color-separating optical device 42 and a red light component thereof is reflected by the dichroic mirror 421. The red light component that has been reflected by the dichroic mirror 421 is then reflected by the reflection mirror 423 and passes through the field lens 417 to reach the red-light liquid crystal panel. The field lens 417 converts the respective sub-beams irradiated from the second lens array 413 into light beams parallel to a central axis (main beam) of the filed lens 417. The field lenses 417 provided on the light-incident sides of the green-light and blue-light liquid crystal panels function in the same manner.

The green light component, one of the blue and green light components transmitted by the dichroic mirror 421, is reflected by the dichroic mirror 422 and transmitted through the field lens 417 to reach the green-light liquid crystal panel. The blue light component passes through the dichroic mirror 422, the relay optical system 43 and the field lens 417 to reach the blue-light liquid crystal panel. Note that the relay optical system 43 is used for the blue light component in order to avoid deterioration in the light utilization efficiency due to light dispersion and the like caused by that the optical path of the blue light component is longer than those of the other color light components. In other words, the relay optical device 43 is used for directly transmitting the sub-beams incident on the incident-side lens 431 to the field lens 417. Note that, although the blue light component of the three color light components is adapted to pass through the relay optical system 43, the red light component, for instance, may alternatively pass through the relay optical system 43.

The electrooptic device 44 includes three liquid crystal panels 441 (a red-light liquid crystal panel 441R, a green-light liquid crystal panel 441G, a blue-light liquid crystal panel 441B) as optical modulators, polarization plates 442, visual-angle corrector plates 444, and a cross dichroic prism 443 as a color-combining optical device.

The liquid crystal panels 441 use, for instance, a polycrystalline silicon TFT (Thin Film Transistor) as a switching element. The color light components separated by the color-separating optical system 42 are modulated in accordance with image information by the three liquid crystal panels 441 and the polarization plates 442 disposed on the light-incident side and light-irradiation side of the liquid crystal panels 441.

Each polarization plate 442 includes an incident-side polarization plate 442A and an irradiation-side polarization plate 442B respectively disposed on the upstream and the downstream of the liquid crystal panel 441 in the optical path.

The incident-side polarization plate 442A transmits polarized light in a predetermined direction out of the respective color light components separated by the color-separating optical system 42 and absorbs the other light beams. The incident-side polarization plate 442A has a substrate made of crystal, sapphire glass or the like with a polarization film attached on the substrate. The incident-side polarization plate 442A is disposed such that the position thereof is adjustable by a below-described position adjuster of the optical component casing 45 relative to a predetermined illumination optical axis set in the optical component casing 45.

The irradiation-side polarization plate 442B is arranged substantially in the same manner as the incident-side polarization plate 442A. The irradiation-side polarization plate 442B transmits a polarized light in a predetermined direction out of the light beam irradiated by the liquid crystal panel 441 and absorbs the other light beams. Alternatively, the polarization film may be attached on the cross dichroic prism 443 without using the substrate, or the substrate may be attached on the cross dichroic prism 443.

The incident-side polarization plates 442A and the irradiation-side polarization plates 442B are arranged so that the directions of the polarization axes thereof are orthogonal with each other.

The visual-angle corrector plate 444 has a substrate on which an optical conversion film is formed. The optical conversion film corrects a visual angle of the optical image formed by the liquid crystal panel 441. By providing the visual-angle corrector plate 444, light leakage on a black screen can be diminished and the contrast of the projected image can be greatly improved. Similarly to the incident-side polarization plate 442A, the visual-angle corrector plate 444 is disposed such that the position thereof is adjustable by the below-described position adjuster of the optical component casing 45 relative to a predetermined illumination optical axis set in the optical component casing 45.

The cross dichroic prism 443 combines the optical image irradiated by the three liquid crystal panels 441 and modulated for each color light component to form a color image. In the cross dichroic prism 443, a dielectric multi-layer film for reflecting red light component and a dielectric multi-layer film for reflecting blue light component are formed along the boundaries of four right-angle prisms substantially in an X-shape. The dielectric multi-layer films combine the three color light components.

The optical filter device 9 is disposed on the upstream of the color-separating optical system 42 and between the second lens array 413 and the polarization converter 414. The optical filter device 9 reflects a predetermined spectral component of the light beam irradiated by the light source lamp 411A to adjust color shades of the projected image.

Note that the detailed structure of the optical filter device 9 will be described below.

In the exemplary embodiment, a combined focal plane on the upstream side in the optical path of the superposing lens 415 and an optical system such as the field lens 417 is positioned between the second lens array 413 and the superposing lens 415, the field lens 417 being disposed in the optical path between the superposing lens 415 and the liquid crystal panel 441 to focus together with the superposing lens 415 the light beam irradiated from the superposing lens 415 onto the image formation area of the liquid crystal panel 441. In other words, a below-described optical filter of the optical filter device 9 is positioned in the vicinity of the combined focal plane on the upstream side in the optical path.

The optical systems 41 to 44 and the optical filter device 9 described above are housed in the optical component casing 45.

As shown in FIGS. 3 to 5, an illumination optical axis A (FIG. 5) of the light beam irradiated by the light source device 411 is set in the optical component casing 45. The optical component casing 45 includes a component housing member 451 (FIG. 3, FIG. 5) having a container-like shape, a lid-shaped member 452 and a position adjuster 445 (FIG. 3, FIG. 4). The component housing member 451 is provided with grooves (not shown) in which the above-described optical components 412 to 415, 417, 421 to 423, 431 to 434, 442A, 444 and the optical filter device 9 are set from above so as to be slidably fitted therein. The lid-shaped member 452 closes an upper opening of the component housing member 451. The position adjuster 445 includes a part of the lid-shaped member 452 and adjusts positions of the incident-side polarization plates 442A and the visual-angle corrector plates 444.

On one end of the optical component casing 45 in substantially L-shape in plan view, the light source device 411 is disposed at a predetermined position relative to the illumination optical axis A (FIG. 5). On the other end, the projection lens 3 is fixed at a predetermined position relative to the illumination optical axis A. On the upstream of the projection lens 3 in the optical path, the electrooptic device 44 is fixed.

4 Arrangement of Power Source Unit

The power source unit 5 supplies electric power provided from the outside via the inlet connector 28 (FIG. 2). As shown in FIGS. 3 and 4, the power source unit 5 is disposed on a side of the light source device 411 of the optical unit 4 so as to extend along the lateral portion 21C, 22C of the exterior case 2. As shown in FIGS. 3 and 4, the power source unit 5 includes a power supply block 51 and a lamp drive block 52.

The power supply block 51 is disposed on the side of the light source device 411 and supplies the electric power provided from the outside via the inlet connector 28 to the lamp drive block 52, the control board and the like. The power supply block 51 is provided with: a circuit board (not shown) having a transformer for converting input alternate-current into a predetermined voltage and a converter for converting the output of the transformer into a predetermined voltage direct-current; and a box-shaped member 511 covering the circuit board, the transformer and the converter being mounted on one side of the power supply block 51.

As shown in FIGS. 3 and 4, the box-shaped member 511 extends between the front and rear sides so as to form a substantially L-shape with the light source device 411. Provided in the rear surface side of the box-shaped member 511 is a first introduction port 511A (FIG. 4) for introducing air from the cooling unit 6. The box-shaped member 511 is also provided with a discharge port 511B (FIG. 3) for discharging the inside air to the outside on an inner side of the substantially L-shape formed by the light source device 411 and the box-shaped member 511. Although not shown in the figures, the box-shaped member 511 is provided with a second introduction port for introducing air discharged from the lamp drive block 52 in a surface on a side away from the light source device 411.

The lamp drive block 52 is disposed on a side of the power supply block 51 so as to extend along the lateral portion 21C, 22C and is provided with a circuit board (not shown) on one side. The circular board includes a converter for providing electric power to the light source device 411 with a stable voltage. Commercial alternate-current electricity input from the power supply block 51 is commutated and converted into direct-current electricity or alternate-current electricity by the lamp drive block 52 to be supplied to the light source device 411. The circuit board of the lamp drive block 52 is housed in the box-shaped member 521 similarly to the power supply block 51.

As shown in FIGS. 3 and 4, the box-shaped member 521 extends between the front and rear sides so as to be parallel to the box-shaped member 511. Provided on the rear surface side of the box-shaped member 521 is an introduction port 521A (FIG. 4) for introducing air from the cooling unit 6. The box-shaped member 521 is also provided with a discharge port (not shown) for discharging the inside air to the outside. The discharge port is formed on a side opposing to the box-shaped member 511 at a position corresponding to that of the second introduction port of the box-shaped member 511.

5 Arrangement of Cooling Unit

The cooling unit 6 cools components inside the projector 1. As shown in FIGS. 3 and 4, the cooling unit 6 includes a power source unit cooling section 61 for cooling mainly the power source unit 5 and a light source device cooling section 62 for discharging the inner air in the projector 1 to the outside.

Note that, although not shown in detail in the figures, the cooling unit 6 also includes a liquid crystal panel cooling section having a cooling fan and a duct which are for cooling the liquid crystal panels 441 and the polarization converter 414.

As shown in FIGS. 3 and 4, the power source unit cooling section 61 is disposed in a space formed by the light source device 411, the power source unit 5 and the rear portion 21D, 22D of the exterior case 2. As shown in FIGS. 3 and 4, the power source unit cooling section 61 includes an intake-side duct 611, a sirocco fan 612 and a first exhaust-side duct 613. The power source unit cooling section 61 introduces, by the drive of the sirocco fan 612, cooling air from the outside of the projector 1 from the intake port (not shown) in the lower case 22 through an air passage formed by the intake-side duct 611, the sirocco fan 612 and the first exhaust-side duct 613, and the first introduction port 511A and the introduction port 521A of the box-shaped members 511, 521 of the power source unit 5 to the inside of the box-shaped members 511, 521. The air introduced into the box-shaped member 521 of the power source unit 5 is introduced into the box-shaped member 511 via the discharge port (not shown) of the box-shaped member 521 and the second introduction port (not shown) of the box-shaped member 511. Inside the box-shaped member 521, when the air flows from the introduction port 521A to the discharge port, the circuit board of the lamp drive block 52 is cooled. The air introduced into the box-shaped member 511 of the power source unit 5 is discharged to the inside of the substantially L shape formed by the box-shaped member 511 and the light source device 411. Inside the box-shaped member 511, when the air flows from the first introduction port 511A and the second introduction port to the discharge port 511B, the circuit board of the power supply block 51 is cooled.

As shown in FIGS. 3 and 4, the light source device cooling section 62 is disposed inside the substantially L-shape formed by the light source device 411 and the box-shaped member 511. As shown in FIGS. 3 and 4, the light source device cooling section 62 includes an axial-flow fan 621 and a second exhaust-side duct 622. The light source device cooling section 62 discharges, by the drive of the axial-flow fan 621, air inside the substantially L-shape formed by the light source device 411 and the box-shaped member 511 (including the air discharged via the power source unit 5) and air in other spaces through an air passage of the axial-flow fan 621 and the second exhaust-side duct 622 via the exhaust port 233 of the front case 23 to the outside of the projector 1 in a projection direction away from the projection lens 3. More specifically, as shown in FIGS. 3 and 4, a plurality of holes 411C1 are formed in surfaces of the lamp housing 411C of the light source device 411, the surfaces mutually opposing in the front side—rear side direction, such that air can flow into or out of the lamp housing 411C. Hence, by driving the axial-flow fan 621, the air inside the lamp housing 411C is drawn to the axial-flow fan 621 via the plurality of holes 441C1. Inside the lamp housing 411C, when the air flows via the plurality of holes 411C1, the light source lamp 411A and the reflector 411B are cooled.

6 Spectral Property of Light Source Lamp

Figure 6:
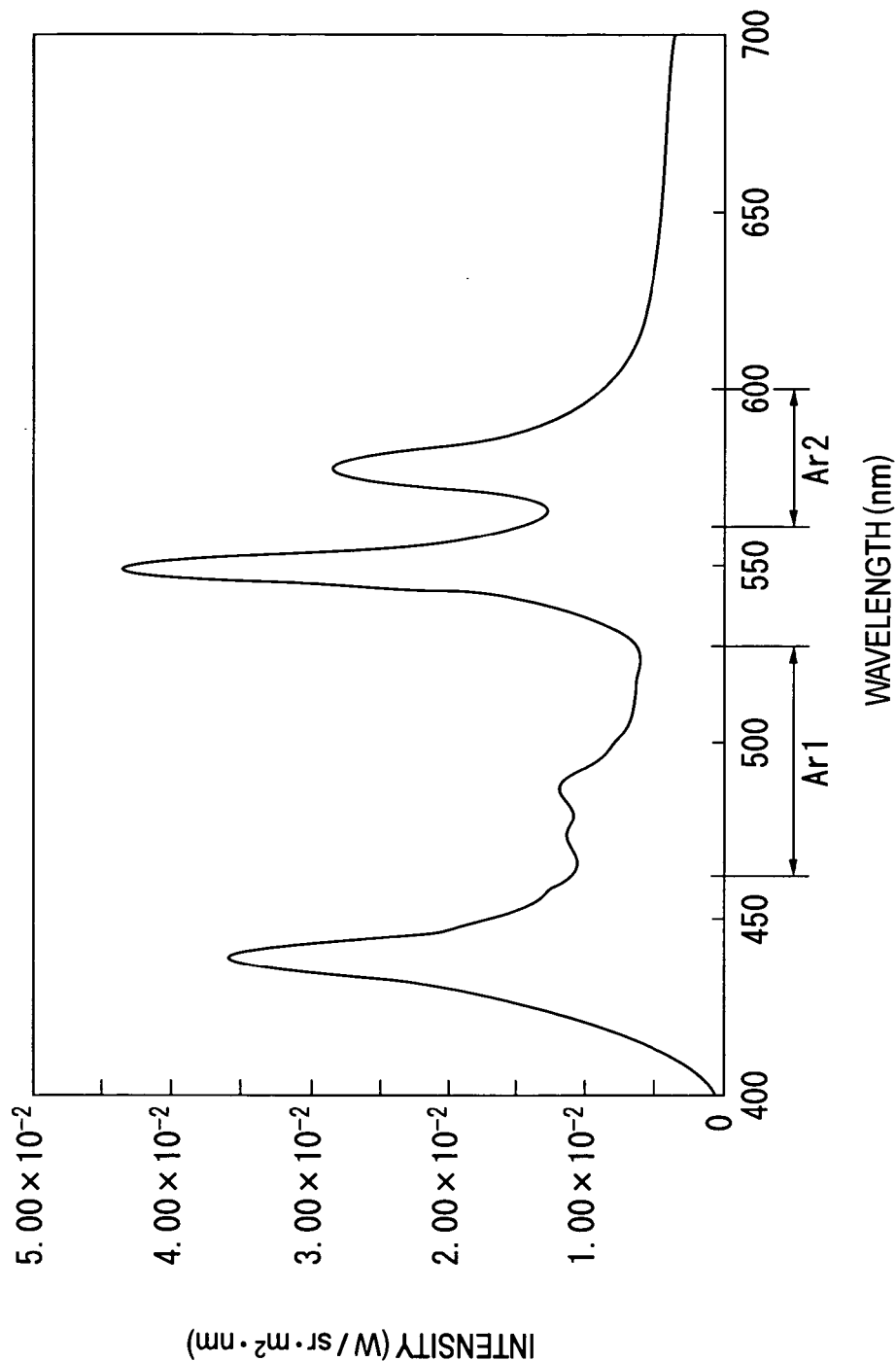
FIG. 6 is a graph showing an example of spectral property of a light source lamp of the aforesaid exemplary embodiment.

FIG. 6 is a graph showing an example of spectral property of the light source lamp 411A.

In the exemplary embodiment, the light source lamp 411A is a high-pressure mercury lamp. In the light source lamp 411A, spectral peaks for blue and green light components are respectively shown around the wavelength of 440 nm (approx. 420 to 460 nm) and around 550 nm (approx. 500 to 570 nm). For red light component, the wavelength is from 600 to 680 nm without any peak unlike the blue and green light components. The intensity of the red light component is about 60% of that of the green light component. The intensity of the blue light component is about 90% of that of the green light component.

7 Structure of Optical Filter Device

Figure 7:
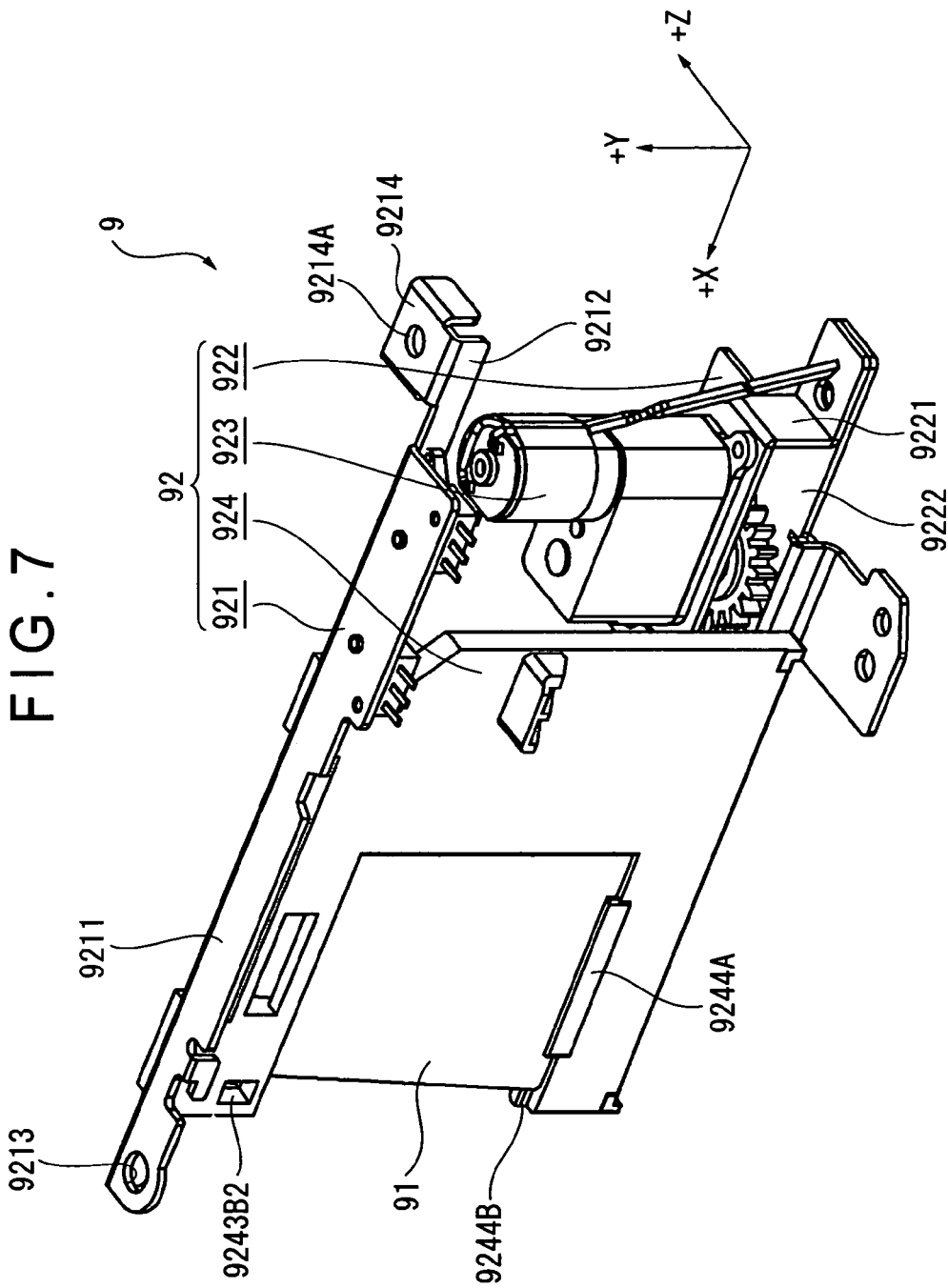
FIG. 7 is an illustration briefly showing a structure of an optical filter device of the aforesaid exemplary embodiment.
Figure 8:
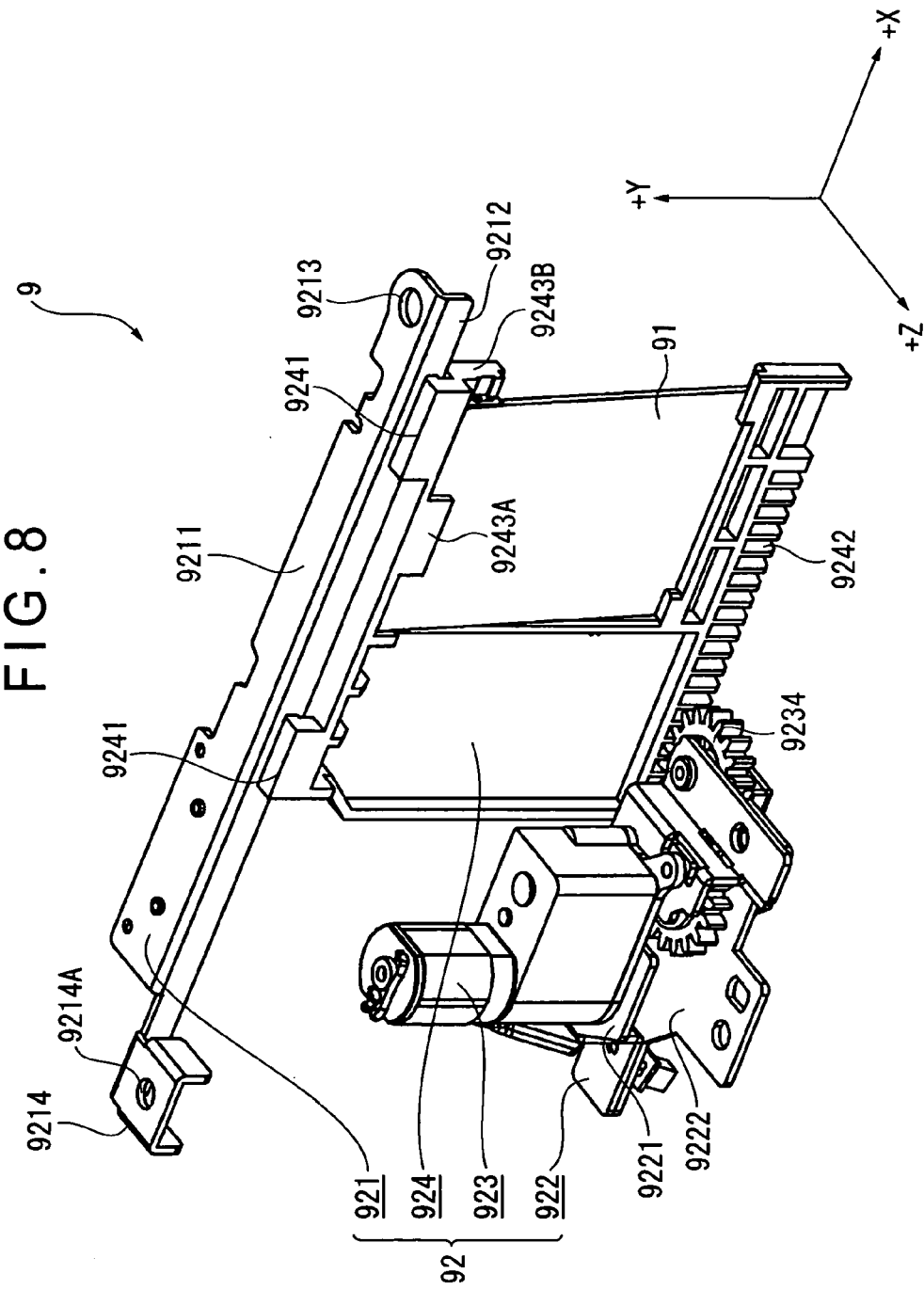
FIG. 8 is another illustration briefly showing the structure of the optical filter device of the aforesaid exemplary embodiment.
Figure 9:
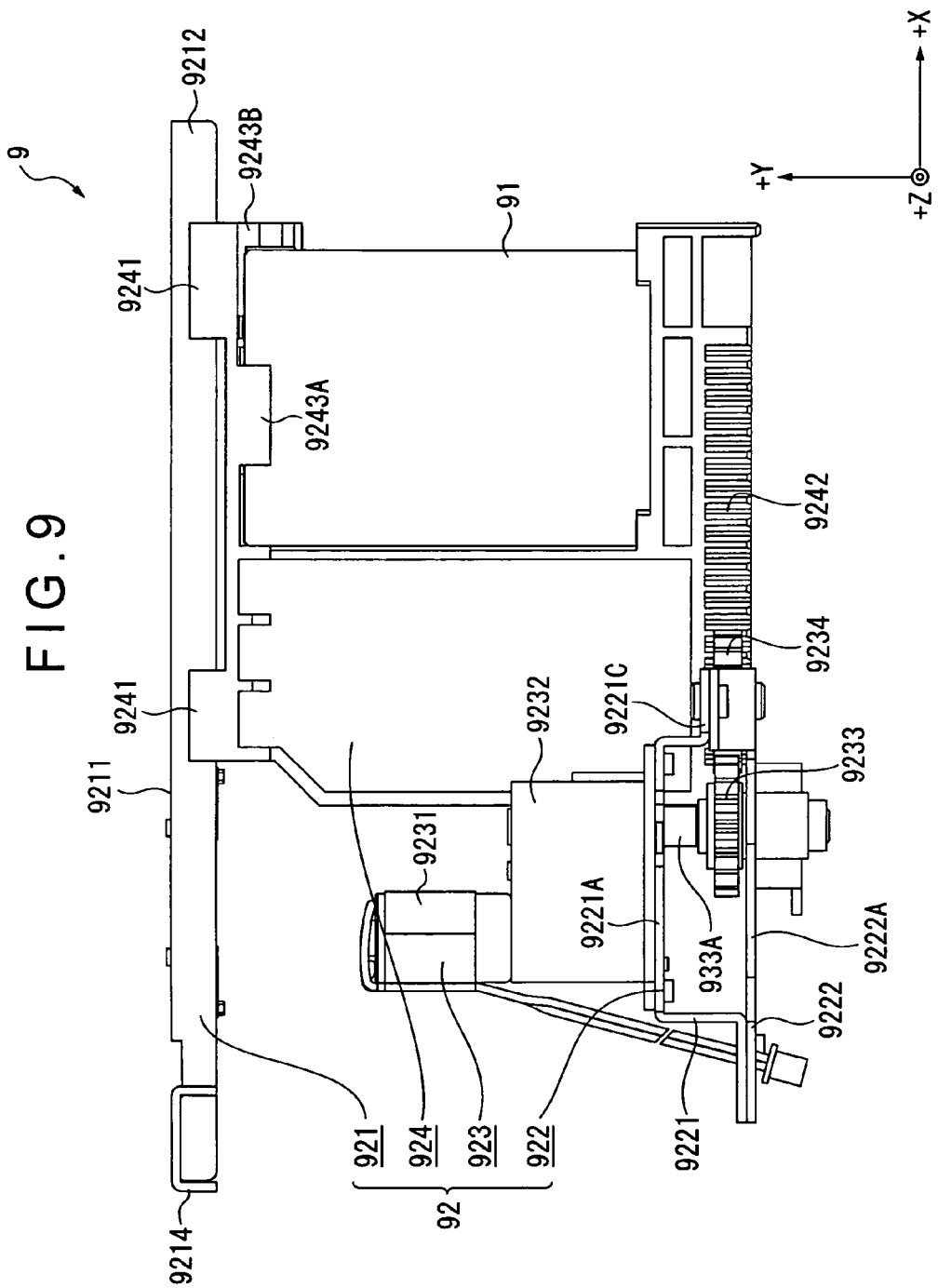
FIG. 9 is another illustration briefly showing the structure of the optical filter device of the aforesaid exemplary embodiment.
Figure 10:
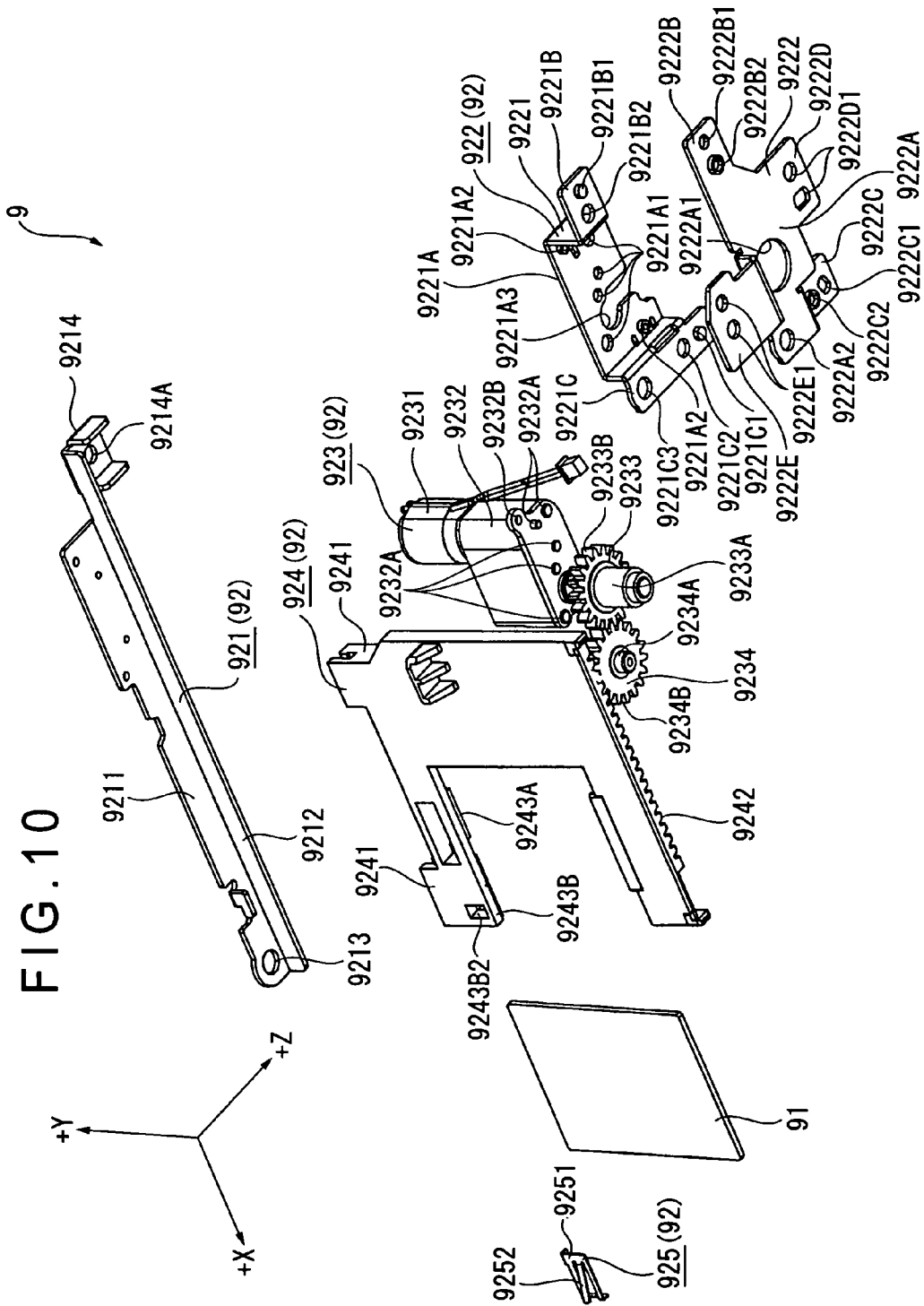
FIG. 10 is another illustration briefly showing the structure of the optical filter device of the aforesaid exemplary embodiment.
Figure 11:
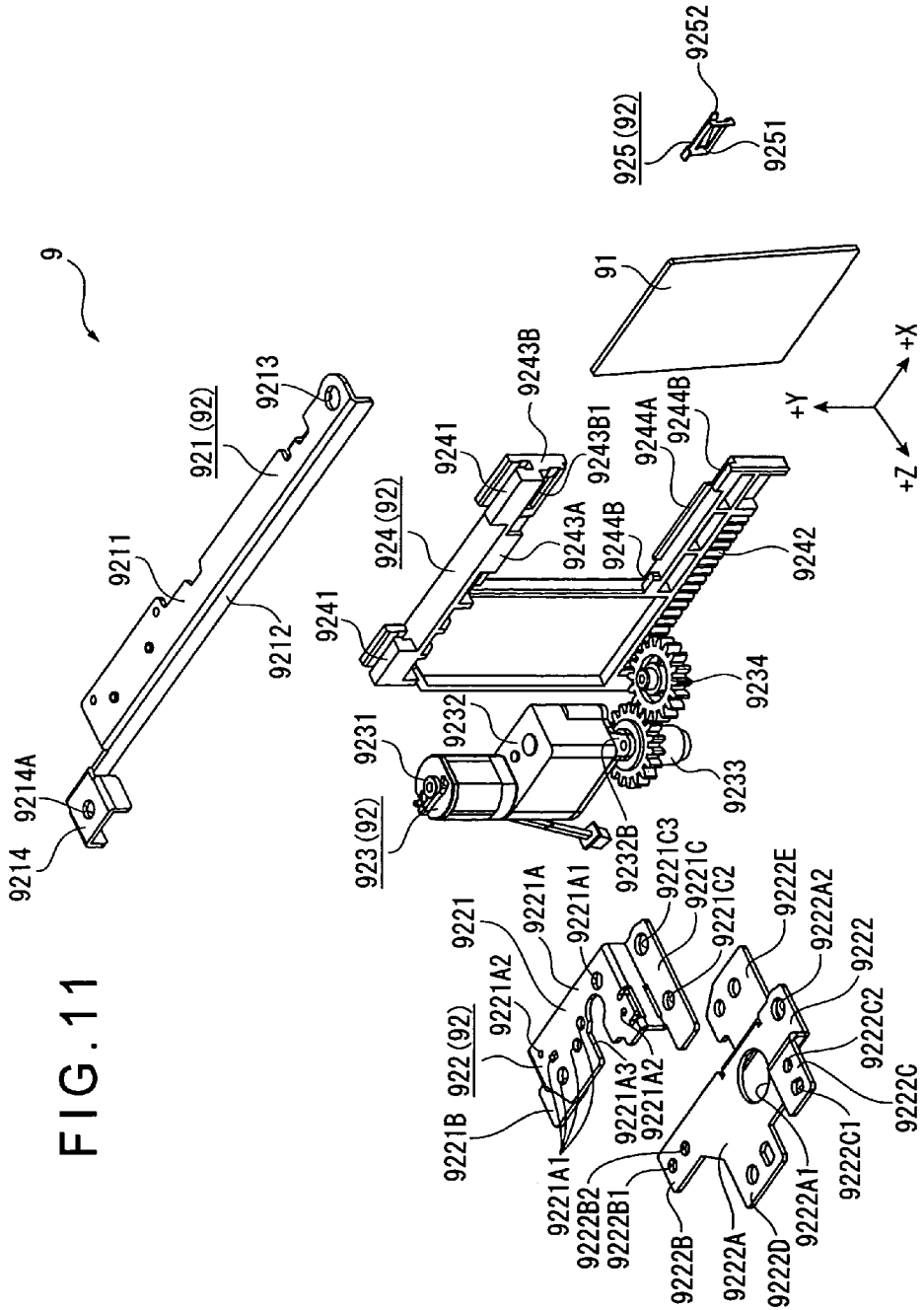
FIG. 11 is another illustration briefly showing the structure of the optical filter device of the aforesaid exemplary embodiment.
Figure 12:
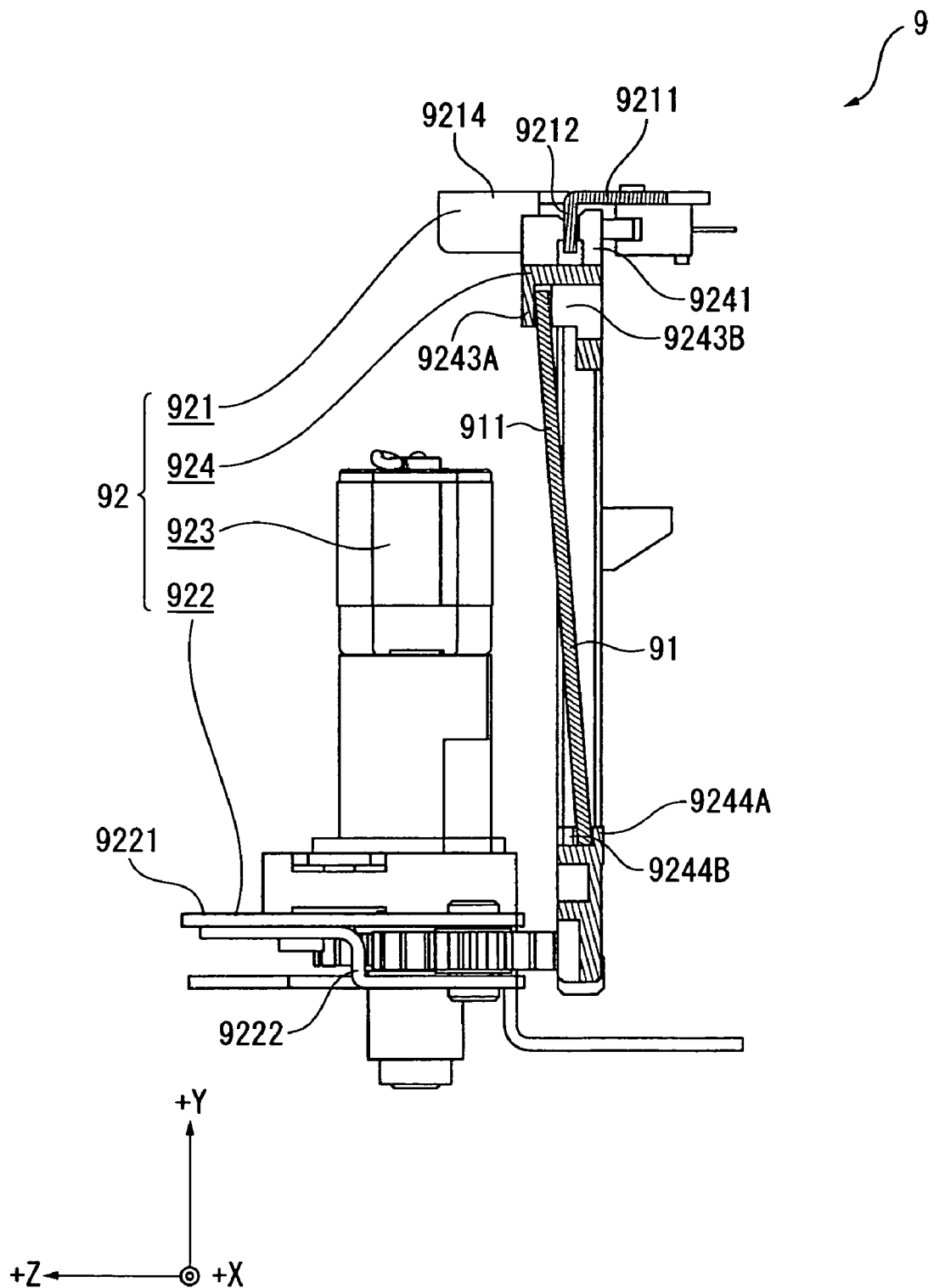
FIG. 12 is another illustration briefly showing the structure of the optical filter device of the aforesaid exemplary embodiment.

FIGS. 7 to 12 are illustrations briefly showing a structure of the optical filter device 9. Specifically, FIG. 7 is a perspective view of the optical filter device 9 when seen from an upper side on the light-incident side. FIG. 8 is a perspective view of the optical filter device 9 when seen from an upper side on the light-irradiation side. FIG. 9 is a plan view of the optical filter device 9 when seen from an upper side on the light-irradiation side. FIG. 10 is an exploded perspective view of the optical filter device 9 when seen from a lower side on the light-incident side. FIG. 11 is an exploded perspective view of the optical filter device 9 when seen from an upper side on the light-irradiation side. FIG. 12 is a cross section of the optical filter device 9 when seen from a lateral side. In the description below, the optical axis of an incident light beam is defined as the Z-axis, two axes orthogonal to the Z-axis are defined as the X-axis (the horizontal axis) and the Y-axis (the vertical axis) to simplify the explanation.

As shown in FIGS. 7 to 12, the optical filter device 9 includes an optical filter 91 and a movement mechanism 92.

7-1 Structure of Optical Filter

The optical filter 91 is movably supported by the movement mechanism 92. The optical filter 91 reflects a predetermined spectral component of an incident light beam and transmits the other spectral components when positioned in the optical path. Although not shown in detail in the figures, the optical filter 91 includes a glass substrate made of a blue glass sheet or a white glass sheet and an optical conversion film in which thin layers of different refractive indexes (high refractive layers and low refractive layers) are alternately deposited on a surface of the glass substrate by vapor-depositing and the like. The material of the high refractive layers may be tantalum pentoxide ($Ta_2O_5$). The material of the low refractive layers may be silicon dioxide ($SiO_2$).

The above-mentioned optical filter 91 is manufactured in accordance with the spectral property of the light source lamp 411A to be used. For example, the optical filter 91 has the transmittance property described below.

As shown in FIG. 6, the optical filter 91 is adapted to reflect an incident light beam in a first wavelength band Ar1 (approx. 460 to 535 nm) and an incident light beam in a second wavelength band Ar2 (approx. 560 to 595 nm). In other words, since the optical filter 91 does not transmit an incident light beam between the red and green spectrums as well as between the green and blue spectrums, the purity of respective color components of red, green and blue of the light beam that has been transmitted through the optical filter 91 can be enhanced.

In addition to enhancing the purity of each color of red, green and blue in the incident light beam, the optical filter 91 is also adapted to have the transmittance set for each color component of red, green and blue so as to balance the strength of each color. For example, the optical filter 91 is set such that the transmittances for green and blue light components, both of which have high intensities, are lower than the transmittance for red light component, thereby substantially equalizing the strength of each color of red, green and blue. Note that the optical filter 91 is not limited to the aforesaid arrangement but may be arranged such that the strengths of the color of red, green and blue are balanced in a different ratio.

7-2 Structure of Movement Mechanism

The movement mechanism 92 supports and moves the optical filter 91 in the directions of arrow R in FIG. 5 into and out of the optical path of the light beam passing along the illumination optical axis A set for the optical component casing 45. As shown in FIGS. 7 to 12, the movement mechanism 92 includes a first fixing member 921, a second fixing member 922, a drive mechanism 923, a movement member 924 and a biasing member 925 (FIG. 10, FIG. 11).

The first fixing member 921 is fixed on the upper side (the upper surface) of the optical component casing 45 (FIG. 3, FIG. 4) and movably supports an edge in the plus direction of the Y-axis (shown FIGS. 7 to 12) of the movement member 924. As shown in FIGS. 7 to 12, the first fixing member 921 includes a plate portion 9211, a rail portion 9212, and fixing portions 9213, 9214, all of these components 9211 to 9214 being integrated together.

As shown in FIGS. 7 to 12, the plate portion 9211 is a substantially rectangular (in plan view) plate extending along the XZ plane. The plate portion 9211 is fixed on the optical component casing 45 via the fixing portions 9213, 9214 with the longitudinal direction of the plate portion 9211 along the X-axis.

As shown in FIGS. 7 to 12, the rail portion 9212 extends substantially downward from an edge in the plus direction of the Z-axis of the plate portion 9211 to engage with a below-described engaging portion of the movement member 924.

As shown in FIGS. 7, 8, 10 and 11, the fixing portion 9213 is a circular hole provided on the plus direction side of the X-axis of the plate portion 9211.

As shown in FIGS. 7 to 12, the fixing portion 9214 is provided at an end in the plus direction of the Y-axis and in the minus direction of the X-axis of the rail portion 9212. The fixing portion 9214 is formed in a plate-like shape projecting from the end in the plus direction of the Y-axis into the plus direction of the Z-axis. A circular hole 9214A is formed substantially in the middle of the fixing portion 9214.

The first fixing member 921 is fixed by inserting fixing screws (not shown) in the fixing portion 9213 and the circular hole 9214A of the fixing portion 9214 and screwing the screws into the optical component casing 45.

The second fixing member 922 is fixed on the lower side (the bottom surface) of the optical component casing 45 and movably supports the drive mechanism 923. As shown in FIGS. 7 to 12, the second fixing member 922 includes a mounting/fixing portion 9221 and a supporting/fixing portion 9222.

The mounting/fixing portion 9221 mounts and fixes a below-described motor and reduction gearbox of the drive mechanism 923 as well as rotatably holds, in cooperation with the supporting/fixing portion 9222, a below-described first gear and second gear of the drive mechanism 923. As shown in FIGS. 10 and 11, the mounting/fixing portion 9221 includes a plate portion 9221A, a first attachment 9221B and a second attachment 9221C, all of these components 9221A to 9221C being integrated.

As shown in FIGS. 10 and 11, the plate portion 9221A is a substantially rectangular (in plan view) plate extending along the XZ plane. The plate portion 9211A is disposed such that its longitudinal direction is along the X-axis.

As shown in FIGS. 10 and 11, the plate portion 9221A is formed with a plurality of positioning holes 9221A1 for positioning the below-described reduction gearbox of the drive mechanism 923 relative to the mounting/fixing portion 9221 and a pair of fixing holes 9221A2 for fixing the reduction gearbox to the mounting/fixing portion 9221.

As shown in FIGS. 10 and 11, the plate portion 9221A is formed with a cutout 9221A3 for receiving to house a shaft of the reduction gearbox.

The first attachment 9221B is for coupling the mounting/fixing portion 9221 and the supporting/fixing portion 9222. As shown in FIGS. 10 and 11, the first attachment 9221B projects from an end in the minus direction of the X-axis of the plate portion 9221A into the minus direction of the Y-axis with a tip in the projecting direction of the first attachment 9221B being substantially in parallel to the XZ plane and extending in the minus direction of the X-axis. As shown in FIG. 10, provided to an extension of the first attachment 9221B are a positioning projection 9221B1 for positioning the mounting/fixing portion 9221 relative to the supporting/fixing portion 9222 and a fixing hole 9221B2 for fixing the mounting/fixing portion 9221 to the supporting/fixing portion 9222.

The second attachment 9221C is for coupling the mounting/fixing portion 9221 and the supporting/fixing portion 9222 as well as for rotatably supporting one end of a shaft of the below-described second gear of the drive mechanism 923. As shown in FIGS. 10 and 11, the second attachment 9221C projects from an end in the plus direction of the X-axis of the plate portion 9221A into the minus direction of the Y-axis with a tip in the projecting direction being substantially in parallel to the XZ plane and extending in the plus direction of the X-axis.

As shown in FIGS. 10 and 11, provided on the plus direction side of the Z-axis of an extension of the second attachment 9221C are a positioning projection 9221C1 for positioning the mounting/fixing portion 9221 relative to the supporting/fixing portion 9222 and a fixing hole 9221C2 for fixing the mounting/fixing portion 9221 to the supporting/fixing portion 9222.

As shown in FIGS. 10 and 11, provided on the minus direction side of the Z-axis of the extension of the second attachment 9221C is a circular hole 9221C3 for rotatably supporting the end of the shaft of the below-described second gear of the drive mechanism 923.

The length in the projecting direction of the above-described first attachment 9221B is set to be larger than that of the second attachment 9221C. Specifically, the extension of the first attachment 9221B is set away in the minus direction of the Y-axis from that of the second attachment 9221C.

The supporting/fixing portion 9222 rotatably holds the below-described first and second gears of the drive mechanism 923 in cooperation with the mounting/fixing portion 9221. The supporting/fixing portion 9222 is fixed on the lower side of the optical component casing 45. As shown in FIGS. 10 and 11, the supporting/fixing portion 9222 includes a plate portion 9222A, a first attachment 9222B, a second attachment 9222C, a first fixing portion 9222D and a second fixing portion 9222E, all of these components 9222A to 9222E being integrated.

As shown in FIGS. 10 and 11, the plate portion 9222A is a substantially rectangular (in plan view) plate extending along the XZ plane. The plate portion 9222A is fixed on the optical component casing 45 via the first fixing portion 9222D and the second fixing portion 9222E with the longitudinal direction of the plate portion 9222A along the X-axis.

As shown in FIGS. 10 and 11, the plate portion 9222A is provided with a circular hole 9222A1 and a circular hole 9222A2. The circular hole 9222A1, which is formed in correspondence with the cutout 9221A3 of the plate portion 9221A of the mounting/fixing portion 9221, is for rotatably supporting the other end of the shaft of the below-described first gear of the drive mechanism 923. The circular hole 9222A2, which is formed in correspondence with the circular hole 9221C3 of the second attachment 9221C of the mounting/fixing portion 9221, is for rotatably supporting the other end of the shaft of the below-described second gear of the drive mechanism 923.

The first attachment 9222B is for coupling the mounting/fixing portion 9221 and the supporting/fixing portion 9222. As shown in FIGS. 10 and 11, the first attachment 9222B projects from an end in the minus direction of the X-axis of the plate portion 9222A into the minus direction of the X-axis. The first attachment 9222B includes a positioning hole 9222B1 and a fixing hole 9222B2 respectively in correspondence with the positioning projection 9221B1 and the fixing hole 9221B2 of the first attachment 9221B of the mounting/fixing portion 9221.

The second attachment 9222C is for coupling the mounting/fixing portion 9221 and the supporting/fixing portion 9222. As shown in FIGS. 10 and 11, the second attachment 9222C projects from an end in the plus direction of the Z-axis of the plate portion 9222A into the plus direction of the Y-axis with a tip in the projecting direction being substantially in parallel to the XZ plane and extending in the plus direction of the Z-axis.

As shown in FIGS. 10 and 11, provided in the extension of the second attachment 9222C are a positioning hole 9222C1 and a fixing hole 9222C2 respectively in correspondence with the positioning projection 9221C1 and the fixing hole 9221C2 of the second attachment 9221C of the mounting/fixing portion 9221.

As shown in FIG. 9, the length in the projecting direction of the second attachment 9222C is set such that the plate portion 9221A of the mounting/fixing portion 92221 is substantially in parallel to the XZ plane and the below-described second gear of the drive mechanism 923 can be disposed between the plate portion 9222A and the extension of the second attachment 9221C of the mounting/fixing portion 9221, when the mounting/fixing portion 9221 and the supporting/fixing portion 9222 are coupled at the first attachments 9221B, 9222B and the second attachments 9221C, 9222C.

As shown in FIG. 9, the length in the projecting direction of the first attachment 9221B of the above-described mounting/fixing portion 9221 is set such that the below-described first gear of the drive mechanism 923 can be disposed between the plate portion 9221A of the mounting/fixing portion 9221 and the plate portion 9222A of the supporting/fixing portion 9222, when the mounting/fixing portion 9221 and the supporting/fixing portion 9222 are coupled at the first attachments 9221B, 9222B and the second attachments 9221C, 9222C.

As shown in FIGS. 10 and 11, the first fixing portion 9222D and the second fixing portion 9222E are respectively provided at an end in the plus direction of the Z-axis of the plate portion 9221A and at an end in the minus direction of the Z-axis. The first fixing portion 9222D and the second fixing portion 9222E are for attaching the second fixing member 922 and the drive mechanism 923 on the lower side of the optical component casing 45. As shown in FIGS. 10 and 11, the first fixing portion 9222D and the second fixing portion 9222E are respectively provided with holes 9222D1 and holes 9222E1, these holes being for positioning and fixing the second fixing member 922 to the optical component casing 45.

The drive mechanism 923 drives to move the movement member 924 in the X-axis directions (the directions of arrow R in FIG. 5), while the drive mechanism 923 being supported by the second fixing member 922. As shown in FIGS. 9 to 11, the drive mechanism 923 includes a motor 9231, a reduction gearbox 9232, a first gear 9233 and a second gear 9234.

The motor 9231 may be a general motor that is driven under the control of the control board and the like. The motor 9231 is disposed such that a motor shaft (not shown) thereof is oriented in the minus direction of the Y-axis. The motor shaft is connected with a shaft (not shown) of the reduction gearbox 9232.

Although not shown in detail in the figures, the reduction gearbox 9232 reduces transferred rotation speed by meshing a plurality of gears (not shown) to each other. As shown in FIGS. 10 and 11, the reduction gearbox 9232, in which shafts (not shown) of the gears are connected with the motor shaft of the motor 9231 and one end of a shaft 9233A of the first gear 9233, reduces the rotation speed of the motor shaft by the drive of the motor 9231 to transfer the reduced speed to the first gear 9233.

As shown in FIGS. 10 and 11, provided to a surface in the minus direction of the Y-axis of the reduction gearbox 9232 are a positioning projection 9232A and a pair of fixing holes 9232B respectively in correspondence with the positioning hole 9221A 1 and a pair of fixing holes 9221A2 of the plate portion 9221A of the second fixing member 922. The motor 9231 and the reduction gearbox 9232 are positioned relative to the second fixing member 922 by fixing the positioning projection 9232A into the positioning hole 9221A1 and fixed to the second fixing member 922 by inserting fixing screws (not shown) into the pair of fixing holes 9221A2 via the pair of fixing holes 9232B.

The shaft 9233A of the first gear 9233 is inserted in and rotatably supported by the cutout 9221A3 and the circular hole 922A1 of the second fixing member 922. The one end of the shaft 9233A of the first gear 9233 is connected with the shafts of the gears of the reduction gearbox 9232, and a meshing portion 9233B meshes with the second gear 9234. Thus, the first gear 9233 transfers the rotation of the gears to the second gear 9234.

A shaft 9234A of the second gear 9234 is inserted in and rotatably supported by the circular hole 9221C3 and the circular hole 922A2 of the second fixing member 922. A meshing portion 9234B of the second gear 9234 meshes with the meshing portion 9233B of the first gear 9233 and a below-described rack of the movement member 924. Thus, the second gear 9234 transfers the rotation of the first gear 9233 to the movement member 924.

The movement member 924 supports and moves the optical filter 91 in the X-axis directions (the directions of arrow R in FIG. 5) along the rail portion 9212 of the first fixing member 921 and the groove (not shown) defined in the bottom surface of the optical component casing 45. As shown in FIGS. 7 to 11, the movement member 924 is a plate having a C-shape in plan view. The movement member 924 is disposed with tips of the C-shape oriented in the plus direction of the X-axis (the direction toward the illumination optical axis A) and supports the optical filter 91 inside the C-shape.

As shown in FIGS. 8 to 12, provided to a surface in the plus direction of the Y-axis of the movement member 924 is a pair of engaging portions 9241 that projects in the plus direction of the Y-axis to form a substantially C-shape in cross section and engage with the rail portion 9212 of the first fixing member 921 in the C-shape.

As shown in FIGS. 8 to 11, a rack 9242 is formed at an end in the minus direction of the Y-axis on a surface in the plus direction of the Z-axis of the movement member 924 so as to extend in the X-axis direction and mesh with the second gear 9234 of the drive mechanism 923. Driving the drive mechanism 923 transfers the rotation of the second gear 9234 to the rack 9242, thereby moving the movement member 924 in the X-axis directions (the directions of arrow R in FIG. 5) to move and dispose the optical filter 91 into the optical path of the light beam at an adjusting position P1 (FIG. 5) where color shades of the projection image are adjusted or to move and dispose the optical filter 91 out of the optical path of the light beam at a non-adjusting position P2 (FIG. 5) where the incident light beam is let to pass toward the downstream in the optical path.

As shown in FIGS. 8 to 12, provided to an end of the movement member 924 in the plus direction of the Y-axis inside the C-shape is a pair of first supporting portions 9243A, 9243B. The pair of first supporting portions 9243A, 9243B is formed on both surfaces of the Z-axis on the plus direction side of the Y-axis of the optical filter 91 so as to project in parallel in the minus direction of the Y-axis with the optical filter 91 set in the movement member 924.

As shown in FIG. 11, the first supporting portion 9243B, which is on the minus direction side of the Z-axis, out of the first supporting portions 9243A, 9243B is provided with a dent 9243B1 for a biasing member 925 on the end surface in the plus direction of the Z-axis on the plus direction side of the X-axis. The dent 9243B1 is formed so as to dent in the minus direction of the Z-axis. As shown in FIGS. 7 and 10, an engaging hole 9243B2 is formed as a part of a bottom portion of the dent 9243B1 so as to pass through the end surface in the minus direction of the Z-axis to be engaged with the biasing member 925.

The distance between the first supporting portions 9243A, 9243B is arranged to be larger than the thickness of the optical filter 91.

As shown in FIGS. 7, 11 and 12, provided to an end of the movement member 924 in the minus direction of the Y-axis inside the C-shape is a pair of second supporting portions 9244A, 9244B. The pair of second supporting portions 9244A, 9244B is formed on both surfaces of the Z-axis on the minus direction side of the Y-axis of the optical filter 91 so as to project in parallel in the plus direction of the Y-axis with the optical filter 91 set in the movement member 924.

Similarly to the first supporting portions 9243A, 9243B, the distance between the second supporting portions 9244A, 9244B is arranged to be larger than the thickness of the optical filter 91.

As shown in FIG. 12, the above-described first supporting portions 9243A, 9243B and second supporting portions 9244A, 9244B are formed at different positions in the Z-axis direction. Specifically, the first supporting portions 9243A, 9243B are at positions displaced in the plus direction of the Z-axis by a predetermined distance from the second supporting portions 9244A, 9244B.

When setting the optical filter 91 to the movement member 924, the ends of the optical filter 91 in the Y-axis directions are inserted respectively between the pair of first supporting portions 9243A, 9243B and between the pair of second supporting portions 9244A, 9244B. In this state, since the pair of first supporting portions 9243A, 9243B and the pair of second supporting portions 9244A, 9244B are displaced from each other in the Z-axis directions, the optical filter 91 is disposed such that a light-irradiation side surface 911 is inclined by a predetermined angle relative to the XY plane (the plane orthogonal to the Z-axis that is the optical axis of the incident light beam) as shown in FIG. 12. More specifically, as shown in FIG. 12, the optical filter 91 is inclined by a predetermined angle relative to the XY plane such that the light-irradiation side surface 911 is oriented in the minus direction of the Y-axis.

As shown in FIGS. 10 and 11, the biasing member 925 is a plate spring in which a spring portion 9252 is bent from a base 9251. The biasing member 925 is inserted between the optical filter 91 and the first supporting portion 9243B with the optical filter 91 set to the movement member 924, so that the biasing member 925 is attached in the dent 9243B1 of the first supporting portion 9243B. When the biasing member 925 is attached, biasing force of the spring portion 9252 makes the base 9251 bias the optical filter 91 from the first supporting portion 9243B to the first supporting portion 9243A (in the direction in which the optical filter 91 is inclined). In addition, when the biasing member 925 is attached, an end of the spring portion 9252 is engaged in the engaging hole 9243B2 of the first supporting portion 9243B, thereby preventing the biasing member 925 from being disengaged due to external forces.

In the exemplary embodiment described above, since the optical filter 91 is disposed in the optical path between the light source device 411 and the liquid crystal panel 441, the optical filter 91 can eliminate a predetermined spectral component of the light beam irradiated by the light source device 411. For example, eliminating a spectral component in the wavelength band for green by the optical filter 91 can prevent a portion to be white from becoming greenish, thereby preventing degradation in contrast of the projection image.

In addition, as compared to an arrangement in which the optical filter 91 is disposed on the downstream of the projection lens in the optical path, disposing the optical filter 91 in the optical path between the light source device 411 and the liquid crystal panel 441 can reduce a difference in incident angles relative to the light-incident side surface of the optical filter 91 between a light beam forming a peripheral portion of the optical image and a light beam forming the middle of the optical image, thereby reducing variation in color.

When the optical filter 91 is disposed in the optical path between the light source device 411 and the liquid crystal panel 441 such that the light-irradiation side surface 911 of the optical filter 91 is orthogonal to the optical axis of the light beam, following problems often occur.

As one example, when the light beam from the light source device 411 is irradiated onto the liquid crystal panel 441, it is known that the light beam is reflected at the outer periphery of the liquid crystal panel 441 to be stray light in the projector 1.

The stray light reflected at the outer periphery of the liquid crystal panel 441 returns back toward the light source device 411 along a trajectory on which the light beam has traveled from the light source device 411 to the liquid crystal panel 441. When the light-irradiation side surface 911 of the optical filter 91 is disposed so as to be orthogonal to the optical axis of the light beam, the stray light is reflected again by the light-irradiation side surface 911 of the optical filter 91 to be irradiated onto the image formation area and the like of the liquid crystal panel 441. In this condition, since unnecessary light is irradiated onto the image formation area of the liquid crystal panel 441, variation in color of the projection image increases, so that the projection image cannot be maintained in an appropriate manner.

In contrast, in the aforesaid exemplary embodiment, the optical filter 91 is disposed such that the light-irradiation side surface 911 is inclined by a predetermined angle relative to the plane orthogonal to the optical axis of the light beam. Accordingly, by setting an inclination angle of the optical filter 91 such that the stray light reflected by the light-irradiation side surface 911 of the optical filter 91 does not hit the image formation area of the liquid crystal panel 441, the unnecessary light can be prevented from being irradiated onto the image formation area of the liquid crystal panel 441, thereby appropriately maintaining the projection image.

The optical filter 91 is disposed on the upstream of the color-separating optical system 42 in the optical path. More specifically, the optical filter 91 is on the upstream of a separating position where light is separated into color light components of red, green and blue by the color-separating optical system 42. Hence, the optical filter 91 can correct each of spectral components in the wavelength bands for red, green and blue of the light beam irradiated by the light source device 411, so that strength balance of the colors can be set to a predetermined level, thereby displaying the projection image in predetermined shades.

Figure 13A:
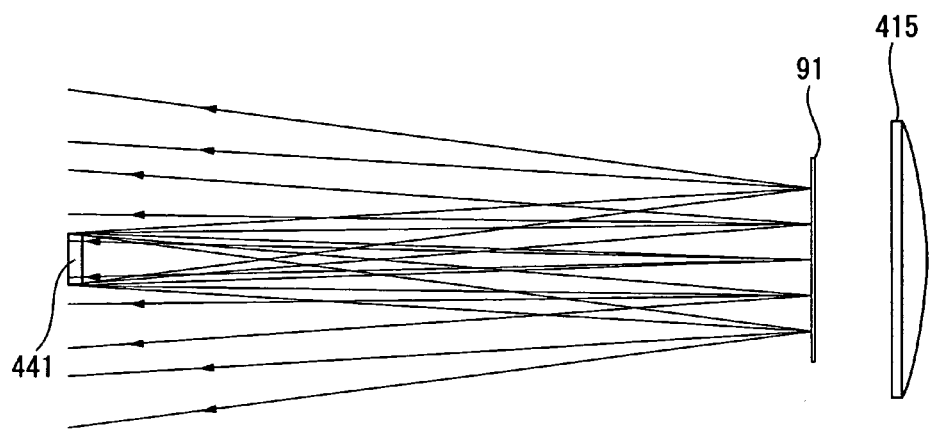
FIG. 13A and FIG. 13B are illustrations for explaining effects of the aforesaid exemplary embodiment.

FIGS. 13A to 16B are illustrations for explaining effects of the aforesaid exemplary embodiment. Specifically, FIGS. 13A, 13B, 14A and 14B schematically show trajectories of the light irradiated by the light source device 411 to an upper end and a lower end (of the outer periphery) of the liquid crystal panel 441 and reflected thereon as well as trajectories of its stray light. FIGS. 13A and 13B schematically show examples in which the optical filter 91 is disposed on the downstream of the superposing lens 415 in the optical path. FIGS. 14A and 14B schematically show examples in which the optical filter 91 is disposed between the superposing lens 415 and the second lens array 413 (more specifically, between the polarization converter 414 and the second lens array 413) (the exemplary embodiment). FIGS. 15A, 15B, 16A and 16B respectively correspond to FIGS. 13A, 13B, 14A and 14B and schematically show the stray light reflected by the light-irradiation side surface 911 of the optical filter 91 and irradiated onto the liquid crystal panel 441.

Note that in FIGS. 13A, 13B, 14A and 14B, only the optical filter 91, the superposing lens 415 and the liquid crystal panel 441 are illustrated, but the other optical components, the movement mechanism 92 and the like are omitted to simplify the explanation.

Figure 13B:
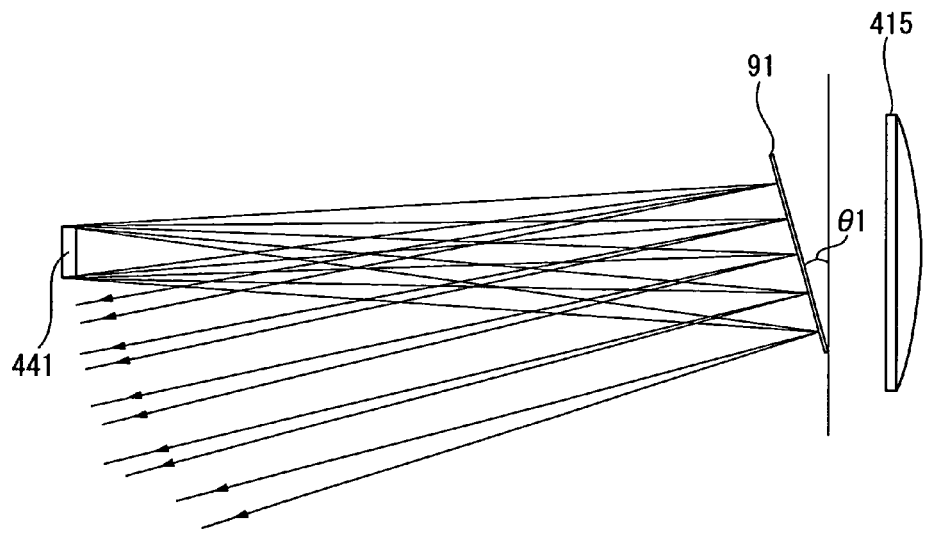

When the optical filter 91 is disposed, in the optical path between the light source device 411 and the liquid crystal panel 441, at a position displaced from a combined focal plane on the upstream side in the optical path of the superposing lens 415 and an optical system such as the field lens 417 that is disposed in the optical path between the superposing lens 415 and the liquid crystal panel 441 and focuses together with the superposing lens 415 the light beam irradiated from the superposing lens 415 onto the image formation area of the liquid crystal panel 441 (hereinafter referred to as a non-focal plane position), more concretely, when the optical filter 91 is disposed on the downstream of the superposing lens 415 in the optical path, the stray light reflected at the outer periphery of the liquid crystal panel 441 is reflected by the light-irradiation side surface 911 of the optical filter 91 as divergent light as shown in FIGS. 13A and 13B.

Figure 15A:
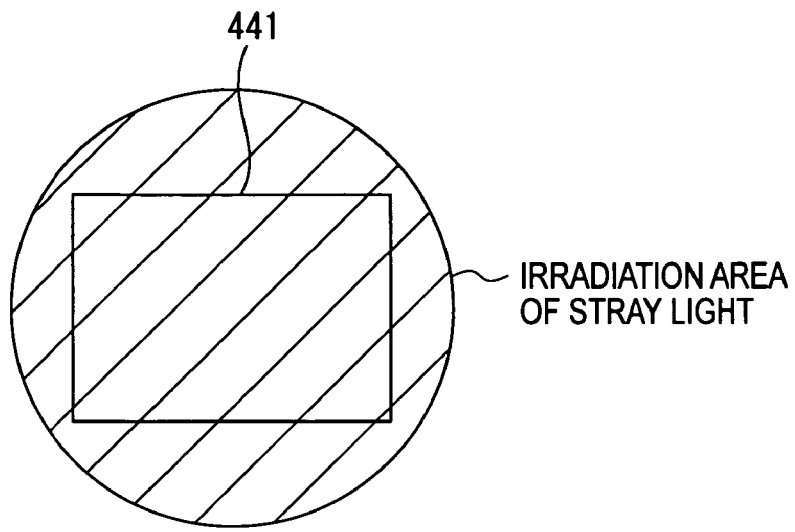
FIG. 15A and FIG. 15B are illustrations for explaining effects of the aforesaid exemplary embodiment.
Figure 15B:
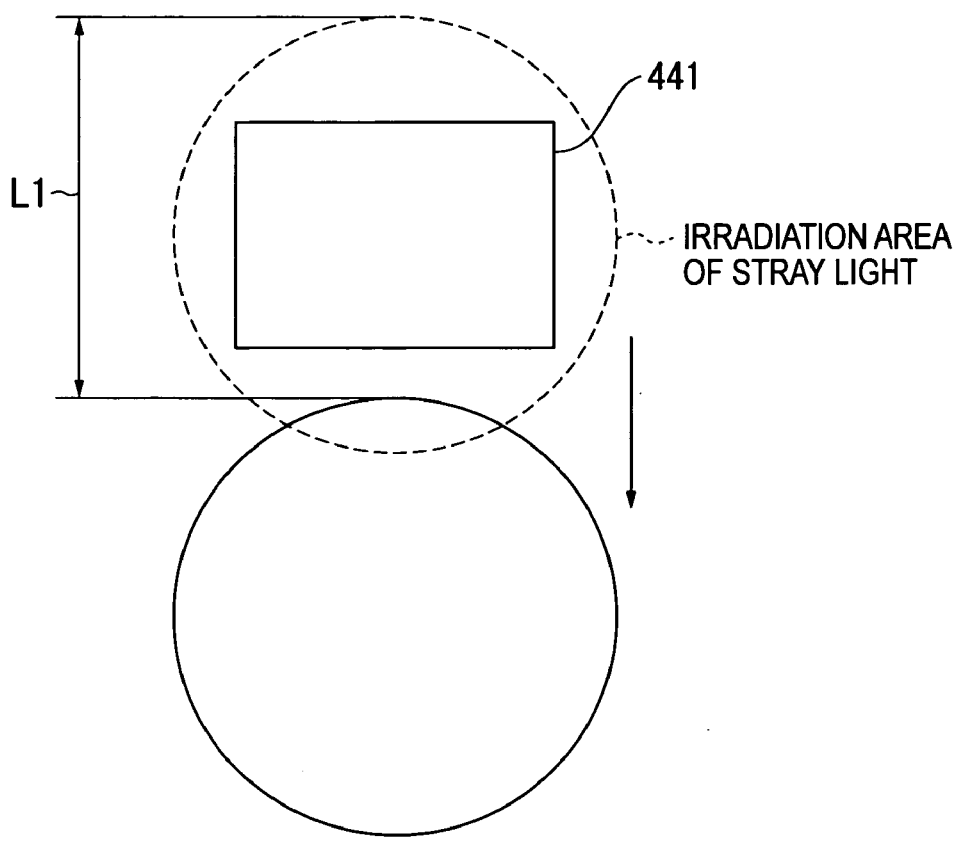

For example, as shown in FIG. 13A, when the optical filter 91 is disposed at the non-focal plane position such that the light-irradiation side surface 911 of the optical filter 91 is orthogonal to the optical axis of the light beam, the stray light reflected at the outer periphery of the liquid crystal panel 441 returns back toward the light source device 411 along the trajectory of the light beam irradiated from the light source device 411 to the liquid crystal panel 441. The returned stray light is reflected again by the light-irradiation side surface 911 of the optical filter 91 as the divergent light and irradiated onto the liquid crystal panel 441 so as to planarly cover the image formation area of the liquid crystal panel 441 as shown in FIG. 15A. In other words, the stray light is irradiated on the liquid crystal panel 441 in a large area. Hence, when an inclination angle θ1 of the optical filter 91 is set such that the stray light reflected by the light-irradiation side surface 911 of the optical filter 91 does not hit the image formation area of the liquid crystal panel 441 as shown in FIG. 13B, a movement amount L1 for moving the stray light irradiated on the liquid crystal panel 441 becomes large as shown in FIG. 15B since the stray light is irradiated on the liquid crystal panel 441 in the relatively large area. In other words, the inclination angle θ1 needs to be relatively large, so that the optical filter 91 requires a wider setting space in the optical axis direction, the setting space being increased in accordance with the increase in the inclination angle θ1 of the optical filter 91. If the optical filter 91 is inclined too much, the projection image often contains variation in color and color shift due to the property of the optical filter 91.

Figure 14A:
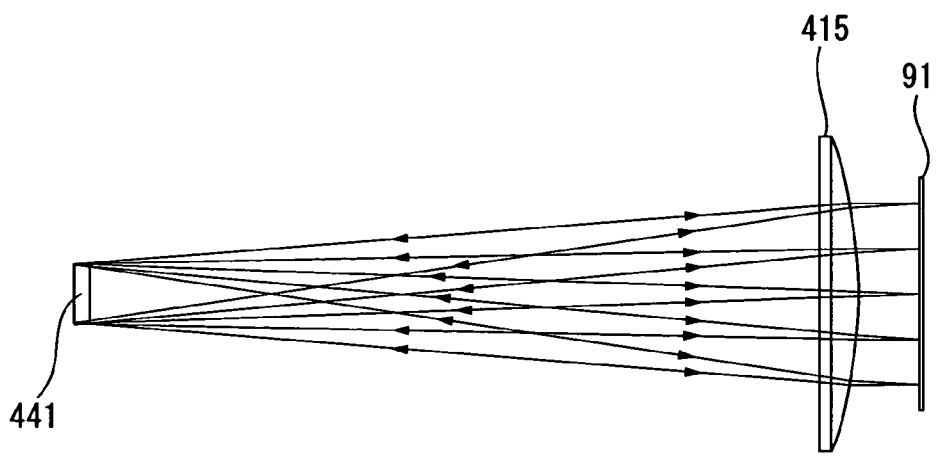
FIG. 14A and FIG. 14B are illustrations for explaining effects of the aforesaid exemplary embodiment.
Figure 14B:
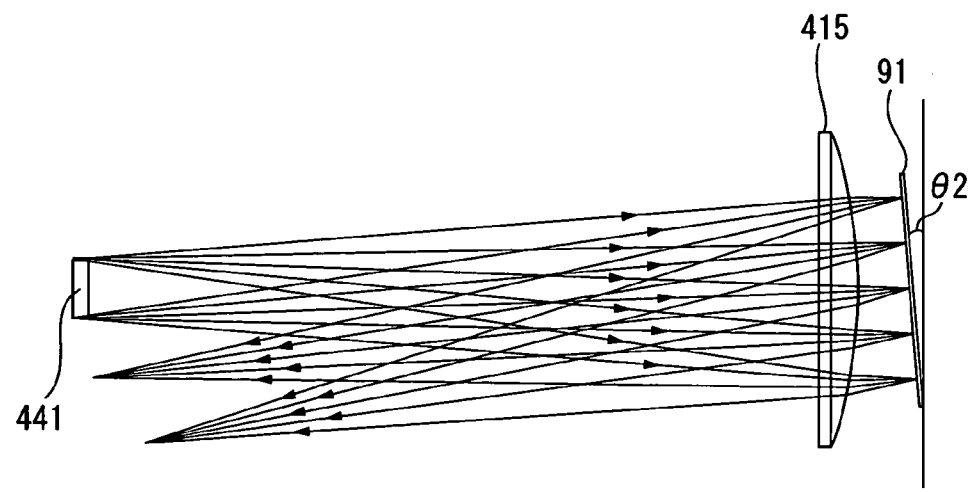

In contrast, in the aforesaid exemplary embodiment, as shown in FIGS. 14A and 14B, the optical filter 91 is disposed in the optical path between the light source device 411 and the liquid crystal panel 441 at a position near the combined focal plane on the upstream side in the optical path of the superposing lens 415 and an optical system such as the field lens 417 that is disposed in the optical path between the superposing lens 415 and the liquid crystal panel 441 and focuses together with the superposing lens 415 the light beam irradiated from the superposing lens 415 onto the image formation area of the liquid crystal panel 441 (hereinafter referred to as a focal plane position). In other words, the optical filter 91 is disposed between the second lens array 143 and the polarization converter 414. Hence, the stray light reflected at the outer periphery of the liquid crystal panel 441 can be reflected by the light-irradiation side surface 911 of the optical filter 91 as convergent light.

Figure 16A:
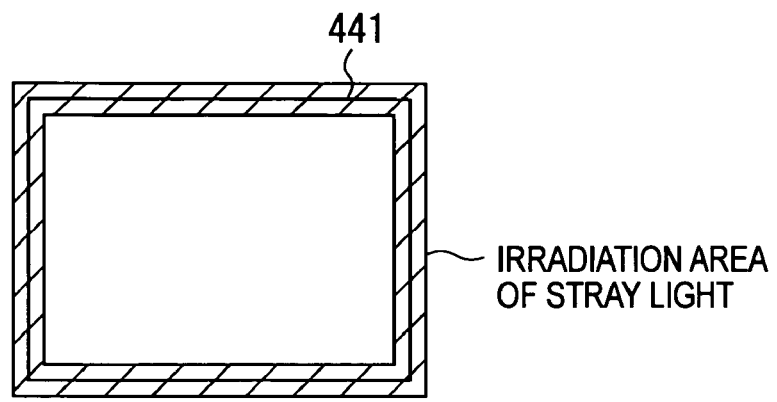
FIG. 16A and FIG. 16B are illustrations for explaining effects of the aforesaid exemplary embodiment.
Figure 16B:
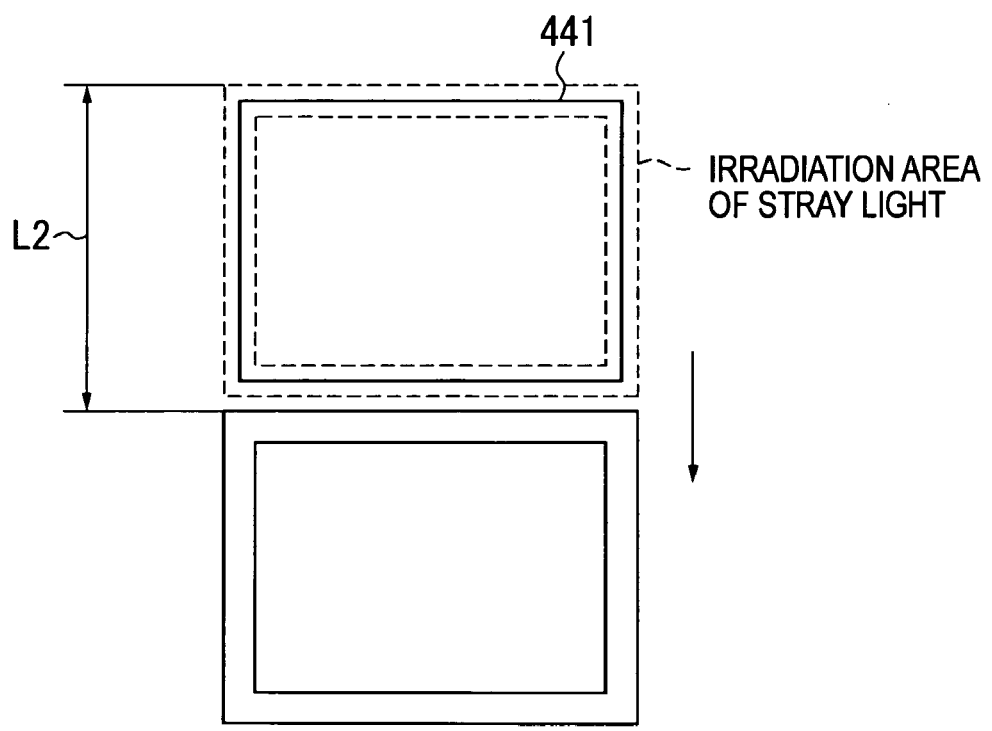

For example, as shown in FIG. 14A, when the optical filter 91 is disposed at the focal plane position such that the light-irradiation side surface 911 of the optical filter 91 is orthogonal to the optical axis of the light beam, the stray light reflected at the outer periphery of the liquid crystal panel 441 returns back toward the light source device 411 along the trajectory of the light beam irradiated from the light source device 411 to the liquid crystal panel 441 to be reflected by the light-irradiation side surface 911 of the optical filter 91 as the convergent light and focused again on the outer periphery of the liquid crystal panel 441. In other words, the stray light is irradiated on the liquid crystal panel 441 in a small area as shown in FIG. 16A. Hence, when an inclination angle $\theta 2$ of the optical filter 91 is set such that the stray light reflected by the light-irradiation side surface 911 of the optical filter 91 does not hit the image formation area of the liquid crystal panel 441 as shown in FIG. 14B, a movement amount L2 for moving the stray light irradiated on the liquid crystal panel 441 becomes small since the stray light is irradiated on the liquid crystal panel 441 in the small area. In other words, the inclination angle $\theta 2$ can be relatively small, so that it is not necessary to widen the setting space of the optical filter 91 in the optical axis direction. In addition, since the inclination angle $\theta 2$ of the optical filter 91 can be set small, variation in color and color shift in the projection image which are caused by inclining the optical filter 91 too much can be avoided.

Note that the above-described inclination angle $\theta 2$ is calculated in consideration of the size of the liquid crystal panel 441, the direction in which the stray light is moved, the optical property of an optical component such as a lens disposed between the optical filter 91 and the liquid crystal panel 441.

Note that the aspect ratio of the liquid crystal panel 441 is generally set such that the horizontal size is larger than the vertical size. Further, in the aforesaid exemplary embodiment, the optical filter 91 is disposed such that the light-irradiation side surface 911 is inclined toward the minus direction of the Y-axis (to face downward) by a predetermined angle relative to the XY plane. In other words, the optical filter 91 is inclined such that the stray light reflected by the light-irradiation side surface 911 of the optical filter 91 is guided to escape to the lower side of the liquid crystal panel 441. When considering the aspect ratio of the liquid crystal panel 441, the stray light reflected by the light-irradiation side surface 911 of the optical filter 91 needs to move a smaller amount when the stray light is guided away in the vertical direction as compared to an amount in the lateral direction. Hence, the movement amount for moving stray light can be small. In other words, the inclination angle $\theta 2$ of the optical filter 91 can be small. Accordingly, the setting space for the optical filter 91 in the optical direction can be small.

Since the optical filter 91 is movably supported by the movement mechanism 92, an appropriate projection image suitable for the purpose of use can be obtained by positioning the optical filter 91 at the adjusting position P1 for business use or at the non-adjusting position P2 for home use by using the movement mechanism 92.

For example, when employing an arrangement in which the movement mechanism rotates the optical filter 91 in an out-plane direction, the setting space for the optical filter 91 in the optical axis needs to be relatively large in order to prevent mechanical interference between the optical filter 91 and the other optical components during rotation.

In the aforesaid exemplary embodiment, the movement mechanism 92 slides the optical filter 91 to the adjusting position P1 and the non-adjusting position P2 with the light-irradiation side surface 911 inclined by a predetermined angle relative to the plane orthogonal to the optical axis of the light beam. Accordingly, the setting space for the optical filter 91 in the optical axis direction can be set small as compared to, for example, the arrangement in which the movement mechanism rotates the optical filter 91 in the out-plane direction, so that the optical filter 91 can be easily disposed in a small space such as a space between the second lens array 413 and the polarization converter 414.

Further, the movement member 924 of the movement mechanism 92 is provided with the pair of first supporting portions 9243A, 9243B and the pair of second supporting portions 9244A, 9244B. A position in the optical axis direction of the pair of first supporting portions 9243A, 9243B is displaced from that of the pair of second supporting portions 9244A, 9244B by a predetermined distance. Accordingly, by supporting opposing sides of the optical filter 91 with the pair of first supporting portions 9243A, 9243B and the pair of second supporting portions 9244A, 9244B, the light-irradiation side surface 911 of the optical filter 91 can be easily set inclined by a predetermined angle $\theta 2$ relative to the plane orthogonal to the optical axis of the light beam.

The optical filter 91 is attached to the movement member 924 by biasing the optical filter 91 in the inclining direction by the biasing member 925. Hence, when the optical filter 91 needs to be replaced due to its defects, the optical filter 91 can be easily released from the biased state by removing the biasing member 925, thereby facilitating the replacement of the optical filter 91.

Since the movement member 924 has the substantially C-shape in plan view and the tips of the C-shape are positioned near the optical axis of the light beam, the movement member 924 does not shield the light beam when the optical filter 91 is moved to the adjusting position P1 and the non-adjusting position P2, thereby appropriately maintaining the projection image.

Note that the scope of the invention is not restricted to the above-described exemplary embodiment, but includes modifications and improvements as long as an object of the invention can be achieved.

In the aforesaid exemplary embodiment, the optical filter 91 is formed in a substantially plate shape in which the light-incident side surface and the light-irradiation side surface are in parallel. And the light-irradiation side surface 911 of the optical filter 91 is adapted to be inclined by a predetermined angle $\theta 2$ relative to the plane orthogonal to the optical axis of the light beam by inclining the whole optical filter 91. However, the invention is not limited thereto. It is only necessary that the light-irradiation side surface of the optical filter is inclined by a predetermined angle $\theta 2$ relative to the plane orthogonal to the optical axis of the light beam. Hence, the optical filter may be formed in a substantially wedge shape in cross section, in which the light-incident side surface and the light-irradiation side surface are not in parallel with the light-irradiation side surface of the optical filter inclined by the predetermined angle θ2 relative to a plane orthogonal to the optical axis of the light beam.

In the aforesaid exemplary embodiment, the optical filter 91 is inclined by the predetermined angle θ2 relative to the XY plane such that the stray light is guided to escape to the lower side of the liquid crystal panel 441, in other words, such that the light-irradiation side surface 911 is oriented to face in the minus direction of the Y-axis. However, the arrangement is not limited thereto. It is only necessary that the light-irradiation side surface 911 is inclined by a predetermined angle θ2 relative to the XY plane, so that an arrangement may be alternatively employed, in which the light-irradiation side surface 911 is inclined by the predetermined angle θ2 relative to the XY plane so as to face in the plus direction of the Y-axis.

In the aforesaid exemplary embodiment, the optical filter 91 is disposed at the focal plane position as shown in FIG. 14B. However, the invention is not limited thereto. An object of the invention can be sufficiently attained by employing, for example, an arrangement in which the optical filter is disposed at the non-focal plane position as shown in FIG. 13B.

In the aforesaid exemplary embodiment, the optical filter 91 is disposed between the second lens array 413 and the polarization converter 414. However, the arrangement is not limited thereto. It is preferable to dispose the optical filter 91 at the focal plane position. The optical filter 91 may be disposed, for example, between the polarization converter 414 and the superposing lens 415.

In the aforesaid exemplary embodiment, the combined focal plane on the upstream side in the optical path of the superposing lens 415 and the field lens 417 is positioned between the second lens array 413 and the superposing lens 415. However, the arrangement is not limited thereto. An alternative arrangement may be employed, in which the combined focal plane on the upstream side in the optical path is positioned at another position. When employing this arrangement, it is preferable that the optical filter 91 is disposed near the combined focal plane on the upstream side in the optical path.

In the aforesaid exemplary embodiment, the integrator illuminating optical system 41 includes the first lens array 412, the second lens array 413 and the superposing lens 415. However, the arrangement is not limited thereto. Another arrangement may be employed, in which an integrator rod using a hollow glass rod or the like and a relay lens. Even when employing this arrangement, it is preferable that the optical filter 91 is disposed near the combined focal plane on the upstream side in the optical path of a lens system contributing in focusing the light beam irradiated by the light source device 411 onto the liquid crystal panel 441.

In the aforesaid exemplary embodiment, the biasing member 925 is disposed between the optical filter 91 and the first supporting portion 9243B. However, the arrangement is not limited thereto. An arrangement in which the biasing member 925 is disposed between the optical filter 91 and the second supporting portion 9244B or an arrangement in which the biasing members 925 are disposed between the optical filter 91 and the first supporting portion 9243B and between the optical filter 91 and the second supporting portion 9244B may be employed.

In the aforesaid exemplary embodiments, the projector 1 that uses the three liquid crystal panels 441 is explained, but the arrangement is not limited thereto. For example, the invention may be applied to a projector using two liquid crystal panels or four or more liquid crystal panels. The liquid crystal panel 441 described in the exemplary embodiment is a transmissive type. However, the liquid crystal panel is not limited to the type, but may be a reflective type or Digital Micro-mirror Device (a trademark of Texas Instruments Incorporated). When employing Digital Micro-mirror Device, it is not necessary to provide the incident-side polarization plate 442A and the irradiation-side polarization plate 442B.

In the aforesaid exemplary embodiment, the optical unit 4 has a substantially L-shape in plan view, but may have another shape such as a substantially U-shape in plan view.

In the aforesaid exemplary embodiment, the front-type projector that projects an image in a direction for observing a screen is taken as an example, but the invention may be applied to a rear-type projector that projects an image in a direction opposite to the direction for observing the screen.

Although the best mode and the like for implementing the invention have been disclosed above, the invention is not limited thereto. In other words, while the invention has been mainly illustrated and described on the specific exemplary embodiment, a person skilled in the art can modify the arrangements such as shape, material, quantity and the like of the above-described exemplary embodiment without departing from the technical idea and scope of the invention.

Therefore, the description limiting the shapes, materials and the like disclosed above is intended to be illustrative for easier understanding but not to limit the invention, hence the invention includes a description using a name of the components without a part of or all of the limitation on the shapes, materials and the like.

The invention can prevent degradation in contrast of a projection image and reduce variation in color thereof, so that the invention can be applied as a projector used for a home theater system and the like.

What is claimed is:

1. A projector, comprising:
    a light source device;
    a color-separating optical system that separates a light beam irradiated by the light source device into a plurality of color light components;
    a plurality of optical modulators that modulate each of the separated plurality of color light components in accordance with image information;
    a color-combining optical device that combines optical images modulated by the plurality of optical modulators;
    a projection optical device that projects the combined optical images in an enlarged manner; and
    an integrator illuminating optical system including:
        a first lens array having a plurality of lens elements that separate the light beam irradiated by the light source device into a plurality of sub-beams;
        a second lens array having a plurality of lens elements of a number corresponding to that of the plurality of lens elements of the first lens array;
        a superposing lens that superposes a plurality of sub-beams irradiated from the second lens array on image formation areas of the optical modulators; and
        an optical filter that reflects a predetermined spectral component of the light beam irradiated by the light source device and transmits the other spectral component, the optical filter being disposed in an optical path between the second lens array and the superposing lens at a position where a light beam reflected at least one of the plurality of optical modulators is reflected by a light-irradiation side surface of the optical filter as convergent light, wherein
the optical filter is disposed such that the light-irradiation side surface is inclined by a predetermined angle relative to a plane orthogonal to an optical axis of the light beam irradiated by the light source device, and
when one of a vertical side and a horizontal side is larger than the other in an aspect ratio of each of the optical modulators, the optical filter is set to be inclined in a direction along the other of the vertical side and the horizontal side.

2. The projector according to claim 1, wherein
the optical filter is disposed upstream of the color-separating optical system in the optical path.

3. The projector according to claim 1, further comprising:
an optical component casing that houses an optical component disposed in the optical path of the light beam; and
a movement mechanism that supports the optical filter and moves the optical filter into and out of the optical path of the light beam inside the optical component casing with the light-irradiation side surface inclined by the predetermined angle relative to the plane orthogonal to the optical axis of the light beam.

4. The projector according to claim 1,
wherein the optical filter is adapted to reflect an incident light beam in the wavelength bands 460 to 535 nm and 560 to 595 nm.

5. The projector according to claim 3, wherein the movement mechanism comprises:
a fixing member to be fixed on the optical component casing;
a movement member that supports the optical filter and is movably attached to the fixing member; and
a drive mechanism that moves the movement member such that the optical filter is positioned in and out of the optical path of the light beam, wherein
the movement member is a plate body having a substantially C-shape, the movement member supporting the optical filter inside the substantially C-shape,
a pair of first supporting portions and a pair of second supporting portions are provided on opposing inner edges of the substantially C-shape of the movement member, both pairs adapted to hold opposing ends of the optical filter,
the pair of first supporting portions and the pair of second supporting portions are located out of alignment with a predetermined gap in the optical axis direction by a predetermined length, both pairs supporting the optical filter with the light-irradiation side surface of the optical filter inclined relative to the plane orthogonal to the optical axis of the light beam, and
a biasing member for biasing the optical filter in an inclining direction of the optical filter is provided in at least one of a first space between the optical filter and one of the pair of first supporting portions located on the other side of the inclining direction of the optical filter and a second space between the optical filter and one of the pair of second supporting portions located on the other side of the inclining direction of the optical filter.

\* \* \* \* \*